United States Patent
Kim et al.

(10) Patent No.: US 9,490,306 B2
(45) Date of Patent: Nov. 8, 2016

(54) DISPLAY DEVICE

(71) Applicant: Samsung Display Co., Ltd., Yongin, Gyeonggi-Do (KR)

(72) Inventors: JungKyun Kim, Seoul (KR); Seokhyun Nam, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 16 days.

(21) Appl. No.: 14/693,029

(22) Filed: Apr. 22, 2015

(65) Prior Publication Data

US 2016/0079318 A1  Mar. 17, 2016

(30) Foreign Application Priority Data

Sep. 12, 2014  (KR) .................. 10-2014-0121133

(51) Int. Cl.
| | |
|---|---|
| *H02N 1/00* | (2006.01) |
| *H01L 27/32* | (2006.01) |
| *H02N 1/04* | (2006.01) |
| *G09G 3/20* | (2006.01) |
| *H02N 1/06* | (2006.01) |

(52) U.S. Cl.
CPC ............ *H01L 27/3225* (2013.01); *G09G 3/20* (2013.01); *H02N 1/04* (2013.01); *G09G 2330/02* (2013.01); *G09G 2330/028* (2013.01); *H02N 1/06* (2013.01)

(58) Field of Classification Search
USPC ................. 310/328, 329, 319, 310, 309, 30
See application file for complete search history.

(56) References Cited

U.S. PATENT DOCUMENTS

| | | | |
|---|---|---|---|
| 3,497,748 A | 2/1970 | Engel | |
| 8,350,252 B2 | 1/2013 | Gao | |
| 2013/0049531 A1 | 2/2013 | Wang et al. | |
| 2015/0061464 A1* | 3/2015 | Park | H01L 41/113 310/329 |
| 2016/0105538 A1* | 4/2016 | Olah | H02N 1/04 455/573 |

FOREIGN PATENT DOCUMENTS

| | | |
|---|---|---|
| KR | 1020080050698 A | 6/2008 |
| KR | 1020100073972 A | 7/2010 |

OTHER PUBLICATIONS

Meng, et al., Rapid Communication, Self-powered flexible printed circuit board with integrated triboelectric generator, ScienceDirect, Nano Energy (2013) 2, pp. 1101-1106.

* cited by examiner

*Primary Examiner* — Tuyet Vo
(74) *Attorney, Agent, or Firm* — Cantor Colburn LLP

(57) ABSTRACT

A display device includes an accommodating member in which an inner space is defined, a display panel accommodated in the inner space in the accommodating member, and an energy generating module disposed between the accommodating member and the display panel and which produces a triboelectricity, where the energy generating module includes a first electrified substrate fixed to the accommodating member and a second electrified substrate disposed on the first electrified substrate, the second electrified substrate moves relative to the first electrified substrate by a frictional event, and the triboelectricity is produced by the relative movement between the first and second electrified substrates.

20 Claims, 20 Drawing Sheets

DISPLAY DEVICE

This application claims priority to Korean Patent Application No. 10-2014-0121133, filed on Sep. 12, 2014, and all the benefits accruing therefrom under 35 U.S.C. §119, the content of which in its entirety is herein incorporated by reference.

BACKGROUND

1. Field

The disclosure relates to a display device. More particularly, the disclosure relates to a display device which generates a triboelectricity.

2. Description of the Related Art

In recent years, various mobile devices come into wide use and various wearable electronic devices have been actively developed. Accordingly, the display device becomes small in size and light in weight to be applied to the mobile devices or the wearable electronic devices.

A small-size display device is typically operated in an environment different from a large-size display device. For instance, the small-size display device is typically operated with a small power compared to the large-size display device. When the display device becomes small in size and light in weight, the display device may be brought to various locations to which a user moves. Therefore, different from the large-size display device that is typically located at a fixed position, various external impacts may be exerted on the small-size display device.

SUMMARY

The disclosure provides a display device in which a triboelectricity is generated using a relative movement between elements thereof and the electricity is used to drive the display device.

An exemplary embodiment of the invention provide a display device including an accommodating member in which an inner space is defined, a display panel accommodated in the inner space in the accommodating member, and an energy generating module disposed between the accommodating member and the display panel to produce a triboelectricity. In such an embodiment, the energy generating module includes a first electrified substrate fixed to the accommodating member and a second electrified substrate disposed on the first electrified substrate, the second electrified substrate moves relative to the first electrified substrate by a frictional event, and the triboelectricity is produced by the relative movement between the first and second electrified substrates.

In an exemplary embodiment, the first electrified substrate includes a first base substrate, a first conductive layer disposed on the first base substrate, and a first electrified layer disposed on the first conductive layer, and the second electrified substrate includes a second base substrate disposed opposite to the first base substrate, a second conductive layer disposed on the second base substrate, and a second electrified layer disposed on the second conductive layer and electrically connected to the second conductive layer.

In an exemplary embodiment, the first electrified substrate may include a first frictional surface defined on a surface of the first electrified layer, which faces the second electrified layer, the second electrified substrate may include a second frictional surface defined on a surface of the second electrified layer, which faces the first electrified layer, the second frictional surface may include a material positioned in a triboelectric series different from a material of the first frictional surface, and the first and second frictional surfaces may have different polarities from each other by the frictional event.

In an exemplary embodiment, the first electrified layer and the first conductive layer may be integrally formed as a single unitary and indivisible unit.

In an exemplary embodiment, the first conductive layer may include: a base layer including a conductive material and disposed on the first base substrate to cover an entire surface of the first base substrate; and a plurality of conductive patterns disposed on the base layer, including a conductive material, and electrically connected to the base layer. In such an embodiment, the first electrified layer may cover the base layer and the conductive patterns, and the first frictional surface may overlap the conductive patterns.

In an exemplary embodiment, the base layer may include a same material as the conductive patterns.

In an exemplary embodiment, the first electrified substrate may further include an intermediate layer disposed between the first conductive layer and the first electrified layer to cover portions of the base layer, which are exposed through the conductive patterns, and the first electrified layer may cover the intermediate layer and the conductive patterns.

In an exemplary embodiment, the first conductive layer may include a same material as a material of the second conductive layer, and the intermediate layer may include a same material as a material of the second electrified layer.

In an exemplary embodiment, the first frictional surface may have a positive (+) electric charge by the frictional event and the second frictional surface may have a negative (−) electric charge by the frictional event.

In an exemplary embodiment, the material of the second frictional surface may include an epoxy resin, and the material of the first frictional surface may include a metal material.

In an exemplary embodiment, the metal material may include copper (Cu), nickel (Ni), or gold (Au).

In an exemplary embodiment, the display device may further include a spacer disposed between the first and second frictional surfaces and which allows the first frictional surface to be spaced apart from the second frictional surface.

In an exemplary embodiment, the spacer may include an insulating material having an elasticity.

In an exemplary embodiment, the second electrified substrate may move substantially in a thickness direction of the second electrified substrate with respect to the first electrified substrate.

In an exemplary embodiment, the second electrified substrate and the first electrified substrate may relatively move in opposite directions from each other.

In an exemplary embodiment, the display panel may include an organic light emitting diode, the second electrified substrate may be fixed to the display panel and integrally moves together with the display panel, and the display panel may move in the inner space by the frictional event.

In an exemplary embodiment, the display device further includes a light source accommodated in the inner space to provide a light to the display panel and an optical member disposed between the display panel and the accommodating member. The second electrified substrate is fixed to the optical member and integrally moves together with the optical member, and the optical member moves in the inner space by the frictional event.

In an exemplary embodiment, the energy generating module may further include a rectifying circuit electrically connected to each of the first and second electrified substrates to rectify the triboelectricity.

In an exemplary embodiment, the energy generating module may further include a chargeable module connected to the rectifying circuit and charged with the triboelectricity output from the rectifying circuit.

In an exemplary embodiment, the energy generating module may be defined by a plurality of energy generating modules, where each of the energy generating modules includes the first and second electrified substrates, and the energy generating modules may be disposed to be spaced apart from each other on a plane surface.

According to exemplary embodiments of the invention described herein, the display device includes the energy generating module that produces the triboelectricity. Elements disposed inside the display device move in predetermined directions when the frictional event occurs on the display device. The energy generating module produces the triboelectricity using the relative movement between the elements.

In such embodiments, the triboelectricity is used to drive the display device for displaying the image or used as a standby-voltage source for the display device. Therefore, the power consumption of the display device is reduced.

In such embodiments, the energy generating module has a structure similar to that of a conventional printed circuit board. Accordingly, a conventional process line may be used to produce the energy generating module, and thus additional manufacturing cost for the energy generating module may be substantially reduced or effectively minimized.

BRIEF DESCRIPTION OF THE DRAWINGS

The above and other features of the disclosure will become readily apparent by reference to the following detailed description when considered in conjunction with the accompanying drawings, in which.

DETAILED DESCRIPTION

Figure 1A:
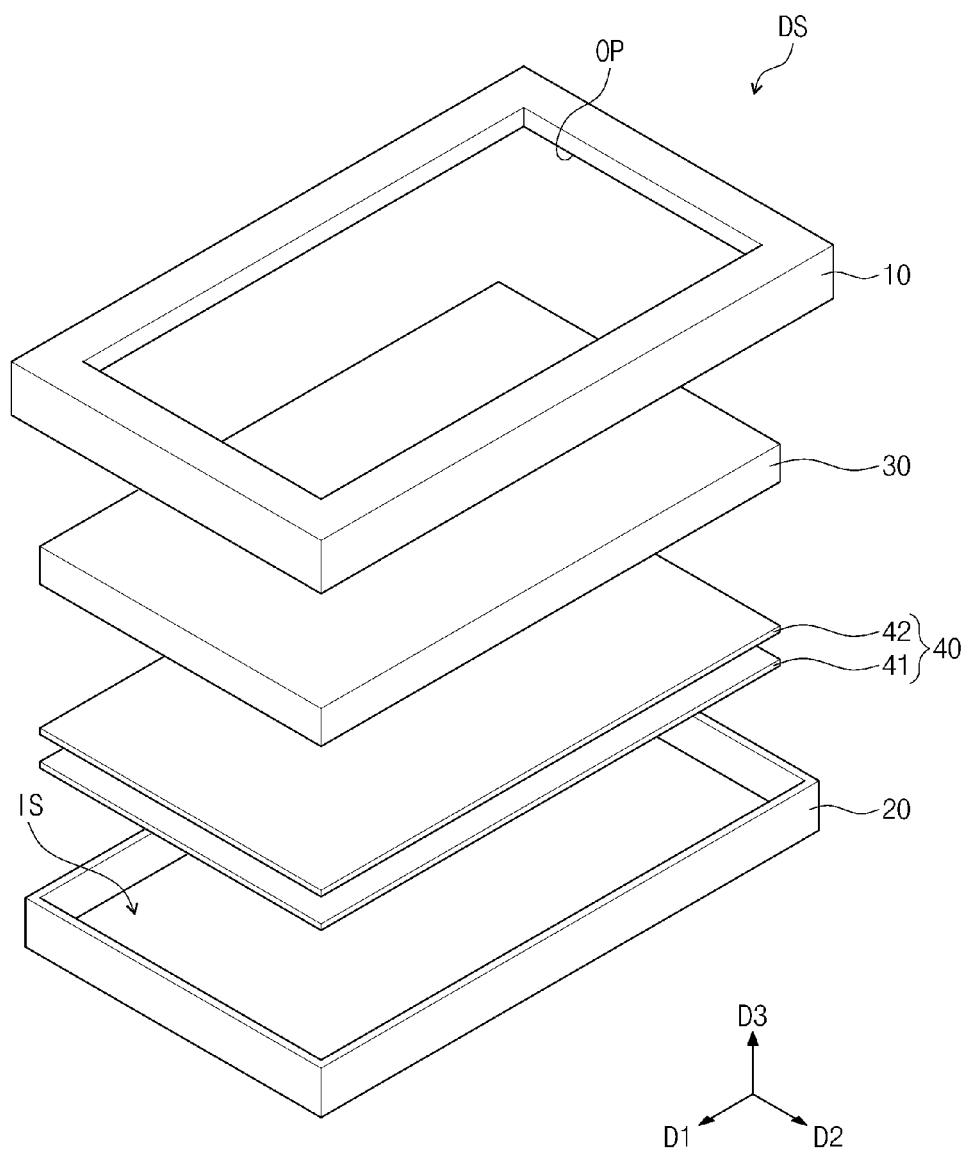
FIG. 1A is an exploded perspective view showing an exemplary embodiment of a display device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

Figure 1B:
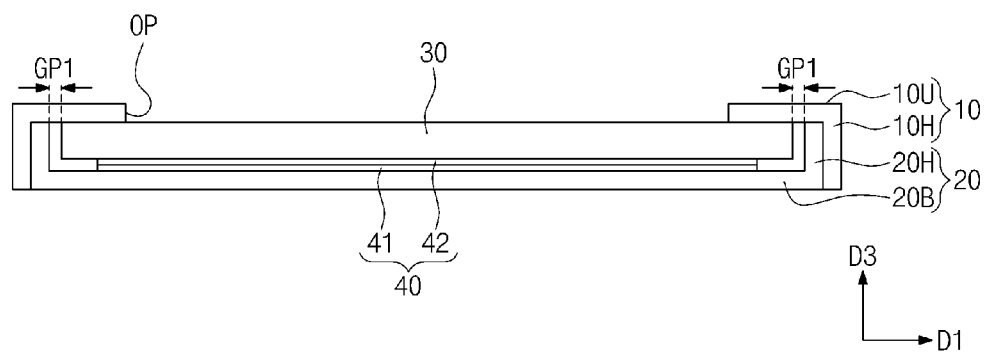
FIG. 1B is a cross-sectional view showing an assembling state of the display device shown in FIG. 1A.

FIG. 1A is an exploded perspective view showing an exemplary embodiment of a display device DS according to the invention, and FIG. 1B is a cross-sectional view showing an assembling state of the display device DS shown in FIG. 1A.

Referring to FIGS. 1A and 1B, an exemplary embodiment of the display device DS includes an upper protection member (e.g., an upper cover or casing) 10, a display panel 30, an energy generating member (also referred to as "energy generator") 40, and a lower protection member (e.g., a lower cover or casing) 20.

In such an embodiment, the upper protection member 10 includes an upper portion 10U and a plurality of upper sidewalls 10H connected to the upper portion 10U. The upper portion 10U is disposed substantially parallel to a plane surface defined by a first direction D1 and a second direction D2, which is perpendicular to the first direction D1.

In such an embodiment, an opening OP is defined through the upper portion to expose a portion of the display panel 30 such that a user is allowed to view the display panel 30 (e.g., a screen on the display panel 30) through the opening OP.

The upper sidewalls 10H may substantially vertically extend from the upper portion 10U in a third direction D3. The third direction D3 is perpendicular to the first and second directions D1 and D2.

In such an embodiment, the lower protection member 20 includes a bottom portion 20B and a plurality of lower sidewalls 20H. The bottom portion 20B is disposed substantially parallel to the plane surface defined by the first and second directions D1 and D2. The lower sidewalls 20H may be substantially vertically extends from the bottom portion 20B in the third direction D3.

In such an embodiment, the lower protection member 20 is coupled to the upper protection member 10 to defined an inner space IS. The upper portion 10U may be substantially parallel to the bottom portion 20B and the upper sidewalls 10H are substantially parallel to the lower sidewalls 20H.

In an exemplary embodiment, as shown in FIG. 1B, the upper sidewalls 10H cover outer portions of the lower sidewalls 20H. Accordingly, the inner space IS may be defined by the lower sidewalls 20H, the bottom portion 20B and the upper portion 10U, not being limited thereto or thereby. In an alternative exemplary embodiment, the lower sidewalls 20H may cover outer portions of the upper sidewalls 10H.

In such an embodiment, the display panel 30 and the energy generating module 40 are disposed (e.g., accommodated) in the inner space IS. The upper protection member 10 and the lower protection member 20 may collectively define an accommodating member (e.g., a casing) 10 and 20. The accommodating member 10 and 20 defines an outer shape of the display device DS.

In an exemplary embodiment, the accommodating member 10 and 20 may be formed by integrally coupling the upper protection member 10 and the lower protection member 20. The accommodating member 10 and 20 may further include an intermediate protection member (not shown). The accommodating member 10 and 20 may have various shapes as long as the accommodating member 10 and 20 defines a predetermined inner space IS corresponding to the display panel 30.

The display panel 30 receives a voltage source to display an image. The display panel 30 may be one of various display panels, such as an organic light emitting display panel, a liquid crystal display panel, a plasma display panel, an electrophoretic display panel and an electrowetting display panel, for example. Hereinafter, an exemplary embodiment, where the display panel 30 is the organic light emitting display panel will be described for convenience of description.

In such an embodiment, the display panel 30 may include a display area and a non-display area disposed adjacent to the display area. The display area displays the image and exposed by the opening OP in the upper protection member 10. The non-display area may be covered by the upper portion 10U and not be exposed to an outside.

The display panel 30 is disposed or accommodated in the inner space IS and spaced apart from at least one of the lower sidewalls 20H by a gap GP1. The gap GP1 may be determined depending on a manufacturing tolerance. In one exemplary embodiment, for example, as the display panel 30 has a shape similar to that of the bottom portion 20B, the gap GP1 is decreased, and as the display panel 30 has a relatively smaller size than the bottom portion 20B, the gap GP1 is increased.

In such an embodiment, the gap GP1 allows the display panel 30 to move in the inner space IS. When external impacts are applied to the display panel 30 or the location of the display panel 30 is changed, the display panel 30 moves with respect to the accommodating member 10 and 20.

In such an embodiment, the energy generating module 40 is disposed in the inner space IS, e.g., between the display panel 30 and the lower protection member 20. The energy generating module 40 may include a first electrified substrate 41 and a second electrified substrate 42.

In such an embodiment, the first electrified substrate 41 is attached or fixed to the accommodating member 10 and 20, e.g., the lower protection member 20. In such an embodiment, the first electrified substrate 41 may be fixed to the bottom portion 20B of the lower protection member 20. Accordingly, in such an embodiment, the first electrified substrate 41 moves together with the accommodating member 10 and 20.

In such an embodiment, the second electrified substrate 42 is disposed on the first electrified substrate 41. The second electrified substrate 42 is allowed to move relatively to the first electrified substrate 41. In such an embodiment, a friction may occur between the first and second electrified substrates 41 and 42 due to the relative movement between the first and second electrified substrates 41 and 42.

The energy generating module 40 produces a triboelectricity from the friction between the first and second electrified substrates 41 and 42. The second electrified substrate 42 is fixed to an element accommodated in the accommodating member 10 and 20. The friction occurs by the relative movement between the accommodating member 10 and 20, to which the first electrified substrate 41 is fixed, and an element to which the second electrified substrate 42 is fixed.

In one exemplary embodiment, for example, the second electrified substrate 42 is fixed to the display panel 30 and moves together with the display panel 30. When the display panel 30 moves in the inner space IS, the second electrified substrate 42 moves together with the display panel 30.

Therefore, the triboelectricity is produced by the relative movement of the display panel 30 to the accommodating member 10 and 20. The energy generating module 40 produces the triboelectricity based on the movement of the display panel 30 and utilizes the triboelectricity as a driving voltage source to drive the display device DS.

In an exemplary embodiment, the energy generating module 40 is electrically connected to the display panel 30 to provide a predetermined voltage source to the display panel 30. In an alternative exemplary embodiment, the energy generating module 40 is connected to a charging module (not shown) to be charged with an electrical voltage, and then the energy generating module 40 applies the voltage source to the display device DS.

Figure 2A:
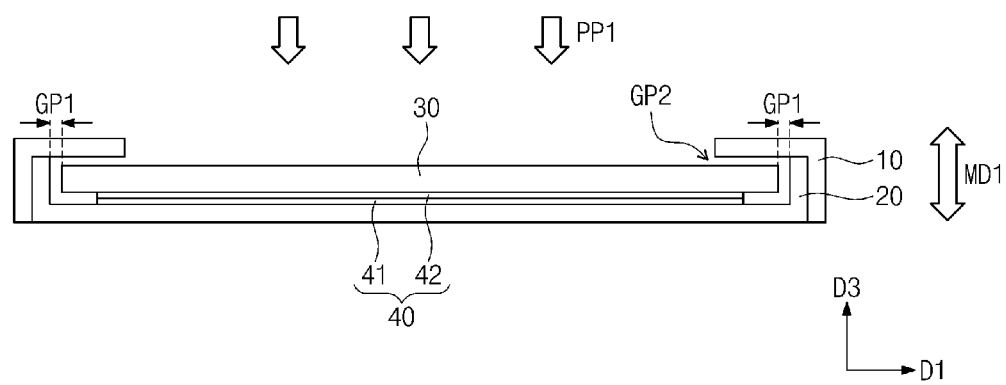
FIGS. 2A and 2B are cross-sectional views showing an assembling state of an exemplary embodiment of a display device according to the invention.
Figure 2B:
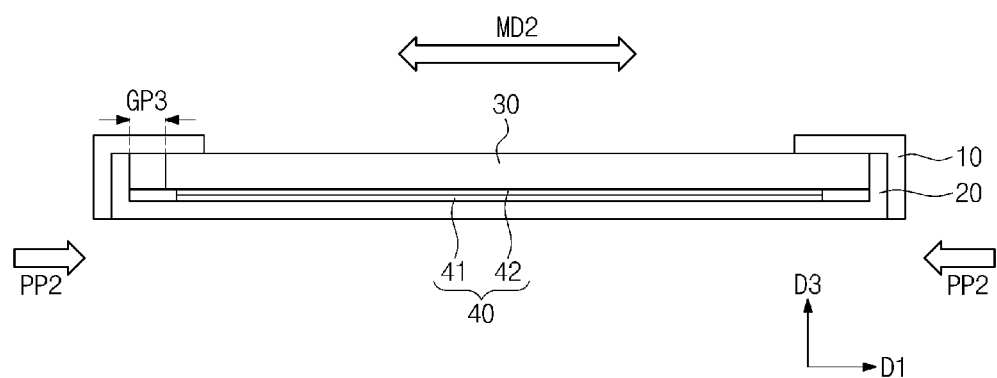

FIGS. 2A and 2B are cross-sectional views showing an assembling state of an exemplary embodiment of a display device according to the invention. FIGS. 2A and 2B show a frictional event that may occur on the energy generating module 40 while various external forces are applied to the display device DS. An inner structure of an exemplary embodiment of the display device DS which may be changed by the frictional event will be described in detail with reference to FIGS. 2A and 2B.

The frictional event may occur by various causes. In one exemplary embodiment, for example, the frictional event may occur by inner elements of the display device DS when the display device DS moves, or the frictional event occur by the squashing or scratching between the inner elements when the inner elements of the display device DS are assembled.

Referring to FIG. 2A, the frictional event may occur by an external force PP1 applied to the third direction D3. The display panel 30 moves in the third direction D3 by the external force PP1. In an exemplary embodiment, external forces PP1 and PP2 may correspond to pressures generated by a pressure applied to the display device DS by the user, a pressure caused by the collision between the display device DS and objects disposed around the display device DS, or a pressure caused by the inertia from the movement of the display device DS.

The display panel 30 may be spaced apart from the upper portion 10U of the upper protection member 10 by a predetermined gap GP2 due to the external force PP1. Accordingly, due to the frictional event, the display panel 30 may relatively moves in the third direction D3 with respect to the upper portion 10U by the gap GP2.

Thus, although not shown in figures, the second electrified substrate 42 moves with respect to (or relative to) the first electrified substrate 41. The relative movement between the first and second electrified substrates 41 and 42 corresponds to the gap GP2 in the third direction D3.

The second electrified substrate 42 moves in the third direction D3 by the frictional event to closer to or farther away from the first electrified substrate 41. When the second electrified substrate 42 moves with respect to the first electrified substrate 41, the friction occurs on the energy generating module 40 along an upper-and-lower direction MD1. The upper-and-lower direction MD1 is substantially parallel to the third direction D3 and corresponds to a thickness direction of the second electrified substrate 42.

The triboelectricity has an output value determined depending on the number and speed of frictions (e.g., the speed of the relative movement between the first and second electrified substrates 41 and 42) in the upper-and-lower direction MD1. In one exemplary embodiment, for example, the output value of the triboelectricity becomes higher as the number of the frictions becomes higher and as the speed of the frictions becomes faster.

Referring to FIG. 2B, in an exemplary embodiment, the friction event may occur by an external force PP2 applied to the first direction D1. The display panel 30 moves in the first direction D1 by the external force PP2 in the first direction D1. In such an embodiment, the friction event caused by the external force applied to the second direction D2 is similar to the friction event caused by the external force PP2 except that the friction event may occur by the external force applied to the second direction D2 (refer to FIG. 1), and any repetitive detailed description thereof will be omitted.

The display panel 30 is spaced apart from the lower sidewalls 20H due to the external force PP2 by predetermined gap GP3. The gap GP3 is different from the gap GP1 between the display panel 30 and the lower sidewalls 20H before the friction event occurs.

Although not shown in figures, in such an embodiment, a gap facing to GP3 may be zero. In one exemplary embodiment, for example, the gap GP3 is defined by distances between a side surface of the display panel 30 and the lower sidewalls facing each other.

In one exemplary embodiment, for example, as shown in FIG. 2A, when the display panel 30 is spaced apart from the lower sidewalls 20H facing each other by the gap GP1 before the friction event caused by the external force PP2 occurs, the display panel 30 may move to closer to one lower sidewall of the lower sidewalls 20H facing each other by the friction event caused by the external force PP2.

Accordingly, the display panel 30 may be positioned to be spaced apart from the other lower sidewall of the lower sidewalls 20H facing each other by the gap GP3 different from the gap GP1. In one exemplary embodiment, for example, the display panel 30 moves relative to the lower sidewalls 20H such that the display panel 30 makes contact with the one lower sidewall of the lower sidewalls 20H facing each other and is spaced apart from the other lower sidewall of the lower sidewalls 20H facing each other by the gap GP3.

In an exemplary embodiment, when the display panel 30 makes contact with the one lower sidewall of the lower sidewalls 20H, the gap GP3 between the display panel 30 and the other lower sidewall of the lower sidewalls 20H may be about two times greater than the gap GP1 before the friction event caused by the external force PP2 in the first direction D1 since the display panel 30 makes contact with the one lower sidewall of the lower sidewalls 20H facing each other.

The display panel 30 relatively moves in the first direction D1 with respect to the accommodating member 10 and 20 by the friction event. Therefore, the second electrified substrate 42 moves with respect to the first electrified substrate 41. The second electrified substrate 42 moves in the first direction D1 opposite to a direction in which the first electrified substrate 41 moves by the friction event.

When the second electrified substrate 42 moves with respect to the first electrified substrate 41, the friction occurs on the energy generating module 40 along a left-and-right direction MD2. The left-and-right direction MD2 is substantially parallel to the first direction D1.

As shown in FIGS. 2A and 2B, the display device DS produces the triboelectricity using the relative movement between the first and second electrified substrates 41 and 42. The elements in the display device DS may move by the external forces PP1 and PP2.

In such an embodiment, where the display device DS is included in a mobile device, the display device DS may be brought to various positions by the user or applied with external impacts. In an exemplary embodiment of the invention, the display device DS produces the triboelectricity using the friction event caused by the movement of the inner elements of the display device DS while being in use and the produced triboelectricity is used as the driving voltage source of the display device DS.

FIGS. 3A to 3E are views showing a process of producing a triboelectricity by an exemplary embodiment of an energy generating module when a frictional event occurs, according to the invention. For convenience of illustration, FIGS. 3A to 3E show a process of producing the triboelectricity in the display device DS shown in FIG. 2A.

Figure 3A:
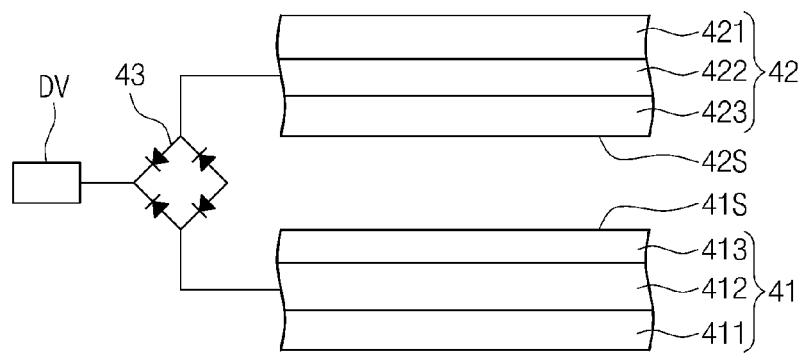
FIGS. 3A to 3E are views showing a process of producing a triboelectricity by using an energy generating module when a frictional event occurs according to an exemplary embodiment of the invention.

Referring to FIG. 3A, the second electrified substrate 42 is disposed on and spaced apart from the first electrified substrate 41. In an exemplary embodiment, the first electrified substrate 41 may include a first base substrate 411, a first conductive layer 412 and a first electrified layer 413.

The first base substrate 411 may include an insulating material, e.g., polyimide ("PI").

The first conductive layer 412 may be disposed on the first base substrate 411. The first conductive layer 412 may cover the entire surface of the first base substrate 411. The first conductive layer 412 may include a conductive material, e.g., copper (Cu).

The first electrified layer 413 may be disposed on the first conductive layer 412. The first electrified layer 413 may cover the first conductive layer 412. The first electrified layer 413 may include a material having an electrification property.

In such an embodiment, the first electrified layer 413 may include a metal material, e.g., copper (Cu), gold (Au), nickel (Ni), etc.

The first electrified layer 413 may define a first frictional surface 41S. The first frictional surface 41S is defined on a surface of the first electrified layer 413, which faces the second electrified substrate 42. The first frictional surface 41S may make contact with the second electrified substrate 42 by the frictional event.

In an exemplary embodiment, an upper surface of the first electrified layer 413 may be defined as the first frictional surface 41S. In an exemplary embodiment, the first electrified layer 413 may have a multi-layer structure, e.g., be configured to include a plurality of layers. In such an embodiment, the first frictional surface 41S is defined on a layer among the layers, which is disposed closest to the second electrified substrate 42.

The second electrified substrate 42 may include a second base substrate 421, a second conductive layer 422 and a second electrified layer 423. The second electrified substrate 42 is disposed to allow the second electrified layer 423 to face the first electrified layer 413.

The second base substrate 421 may include an insulating material, e.g., PI.

The second conductive layer 422 may be disposed on the second base substrate 421. The second conductive layer 422 may include a conductive material, e.g., copper (Cu).

In an exemplary embodiment, the first base substrate 411 includes substantially the same material as that of the second base substrate 421. The first conductive layer 412 includes substantially the same material as that of the second conductive layer 422.

The second electrified layer 423 may be disposed on the second conductive layer 422. The second electrified layer 423 may cover the second conductive layer 422.

The second electrified layer 423 may define a second frictional surface 42S. The second frictional surface 42S may be defined on a surface of the second electrified layer 423, which faces the first electrified substrate 41. The second frictional surface 42S may make contact with the first frictional surface 41S by the frictional event.

The second electrified layer 423 may include a material having an electrification property. The material of the second electrified layer 423 is positioned in a triboelectric series different from that of the material of the first electrified layer 413.

Figure 3B:
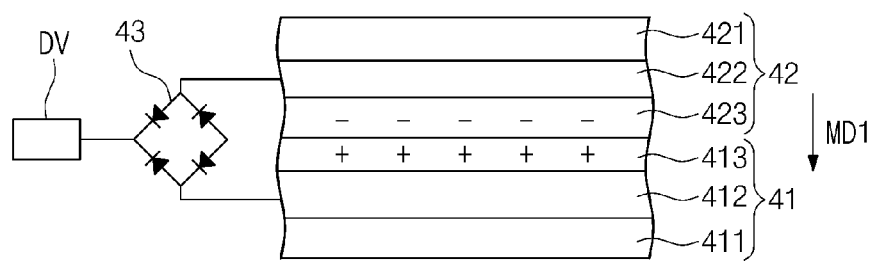

As shown in FIG. 3B, the second electrified substrate 42 may move in the upper-and-lower direction MD1 by the frictional event. When the second electrified substrate 42 moves to be adjacent to the first electrified substrate 41, the first frictional surface 41S makes contact with the second frictional surface 42S.

The material of the first frictional surface 41S is positioned in a triboelectric series different from that of the material of the second frictional surface 42S. Therefore, the first and second frictional surfaces 41S and 42S have different polarities from each other due to the friction between the first and second frictional surfaces 41S and 42S.

In one exemplary embodiment, for example, the second frictional surface 42S includes an epoxy-based resin, and the first frictional surface 41S includes gold or nickel. The gold or nickel has a tendency to lose electrons compared to the epoxy-based resin. Thus, when the first and second frictional surfaces 41S and 42S make contact with each other, the first frictional surface 41S is electrified to have a positive (+) electric charge and the second frictional surface 42S is electrified to have a negative (−) electric charge.

Figure 3C:
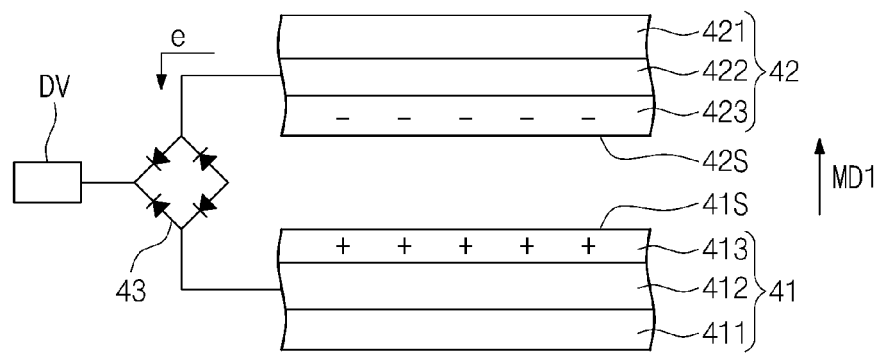

Referring to FIG. 3C, the second electrified substrate 42 moves in the upper-and-lower direction MD1 by the frictional event. The second electrified substrate 42 may move to be farther away from the first electrified substrate 41, and the first frictional surface 41S is spaced apart from the second frictional surface 42S.

When the second electrified substrate 42 moves to be farther away from the first electrified substrate 41, the electrons existing on the second frictional surface 42S continuously exist even though the second frictional surface 42S is spaced apart from the first frictional surface 41S since the second electrified layer 423 is electrically insulated from the second conductive layer 422. Different from the second electrified layer 423, the first electrified layer 413 is electrically connected to the first conductive layer 412. Accordingly, the first conductive layer 412 has the positive (+) electric charge. Therefore, the first electrified substrate 41 has an electric potential higher than that of the second electrified substrate 42.

The electrons move from a position of lower electric potential to a position of higher electric potential. Thus, when the first electrified substrate 41 has an electric potential higher than that of the second electrified substrate 42, the electrons move from the second conductive layer 422 to the first conductive layer 412. The energy generating module 40 makes the free electrons moving toward the outside of the second conductive layer 422, and thus the first and second electrified substrates 41 and 42 are electrically balanced to each other.

The free electrons output from the second conductive layer 422 may move through a conducting wire. Accordingly, the triboelectricity that causes a current flowing from the first electrified substrate 41 to the second electrified substrate 42 is produced. The current continuously flows until the first and second electrified substrates 41 and 42 of the energy generating module 40 are electrically balanced to each other.

Figure 3D:
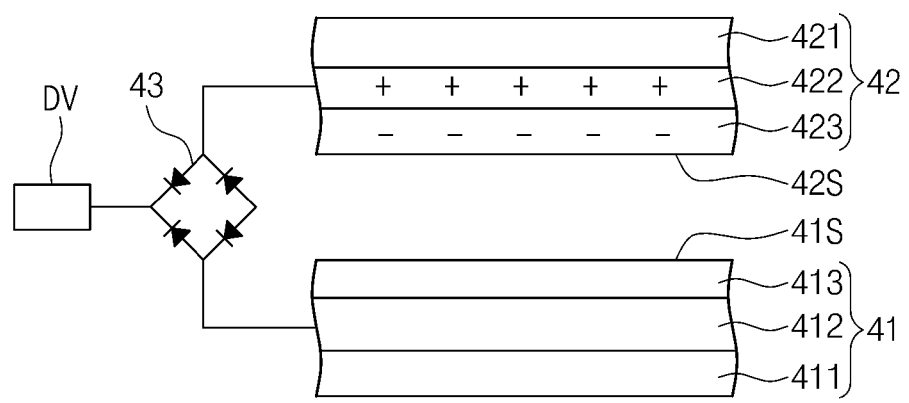

When a predetermined time lapses while the first and second electrified substrates 41 and 42 are spaced apart from each other as shown in FIG. 3D, an amount of the electrons flowing from the second electrified substrate 42 to the first electrified substrate 41 is reduced and the energy generating module 40 is electrically stabilized.

When the electrons flows from the second electrified substrate 42 to the first electrified substrate 41, the electrons move to the outside of the second conductive layer 422, and the second conductive layer 422 is electrified to have the positive (+) electric charge. Accordingly, the second conductive layer 423 and the second conductive layer 422 are electrically balanced to each other, and the second electrified substrate 42 is thereby electrically stabilized.

Figure 3E:
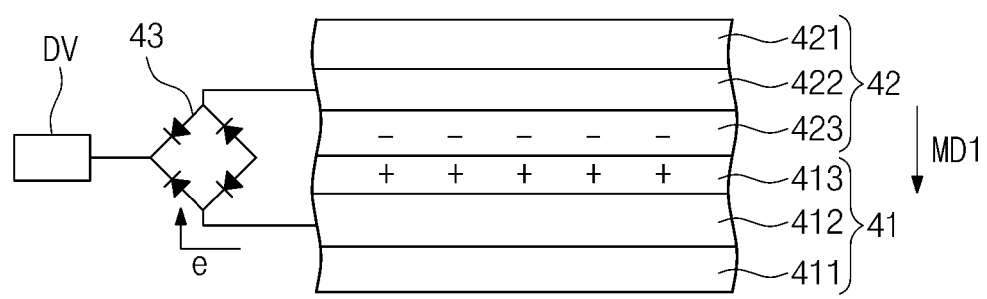

Referring to FIG. 3E, the second electrified substrate 42 may move in the upper-and-lower direction MD1 by the frictional event to be closer to the first electrified substrate 41.

When the second electrified substrate 42 may move in the upper-and-lower direction MD1 to be closer to the first electrified substrate 41, the second frictional surface 42S has the negative (−) electric charge since the electrons exist on the second frictional surface 42S. Therefore, when the second frictional surface 42S becomes closer to the first frictional surface 41S, the first frictional surface 41S is electrified to have the positive (+) electric charge.

As the second electrified substrate 42 becomes closer to the first electrified substrate 41, the electric potential of the second frictional surface 42S becomes high. The second electrified substrate 42 makes the free electrons of the first conductive layer 412 move to the outside of the second electrified substrate 42, and thus the second electrified substrate 42 is electrically balanced.

The free electrons may output from the first conductive layer 412 move through a conducting wire. When the free electrons from the first conductive layer 412 moves through the conducting wire, the triboelectricity that causes a current flowing from the second electrified substrate 42 to the first electrified substrate 41 is produced. The current continuously flows until the first and second electrified substrates 41 and 42 of the energy generating module 40 are electrically balanced to each other.

Although not shown in figures, when the frictional event shown in FIG. 3C repeatedly occurs and the energy generating module 40 is repeatedly operated in modes shown in FIGS. 3C to 3E, the triboelectricity having a usable electric energy, e.g., an electric energy substantially large enough to be used in an display device DV, may be produced.

In such an embodiment, the energy generating module 40 may produce the triboelectricity having the electric energy varied depending on the number and speed of frictions in the upper-and-lower direction MD1. In such an embodiment, the electric energy of the triboelectricity becomes higher as the number of the frictions becomes higher and as the speed of the frictions becomes faster.

Referring to FIGS. 3A to 3E, in an exemplary embodiment, the current output by the triboelectricity produced by the energy generating module 40 may be an alternating current ("AC"). Accordingly, in such an embodiment, the energy generating module 40 may further include a rectifier 43.

The rectifier 43 is electrically connected to the first and second electrified substrates 41 and 42. The rectifier 43 converts the current output from the energy generating module 40 to a direct current ("DC").

The rectifier 43 may include a rectifying circuit. In one exemplary embodiment, for example, the rectifier 43 includes a bridge rectifying circuit. In such an embodiment, the current output from the second electrified substrate 42 and the current output from the first electrified substrate 41 pass through the rectifier 43, such that the energy generating module 40 outputs the DC.

The energy generating module 40 is electrically connected to an external device DV. The external device DV receives the direct current provided from the rectifier 43.

The external device DV may be an output part that receives the triboelectricity produced by the energy generating module 40 and outputs the received triboelectricity. In one exemplary embodiment, for example, the external device DV may be the display panel 30 (refer to FIG. 1) or a chargeable module. The chargeable module may be charged with the triboelectricity and operated or controlled to provide the charged triboelectricity to the display device DS.

FIGS. 4A to 4E are views showing another process of producing a triboelectricity by an exemplary embodiment of an energy generating module when a frictional event occurs, according to the invention. For convenience of illustration, FIGS. 4A to 4E show the production of the triboelectricity with reference to the display device DS shown in FIG. 2B.

The energy generating module shown in FIGS. 4A to 4E has substantially the same structure and function as those of the energy generating module 40 shown in FIGS. 3A to 3E except that the frictional event occurs by the frictions of the first and second electrified substrates 41 and 42 moving in the left-and-right direction MD2. The same or like elements shown in FIGS. 4A to 4E have been labeled with the same reference characters as used above to describe the process of producing a triboelectricity shown in FIGS. 3A to 3E, and any repetitive detailed description thereof will hereinafter be omitted or simplified.

Figure 4A:
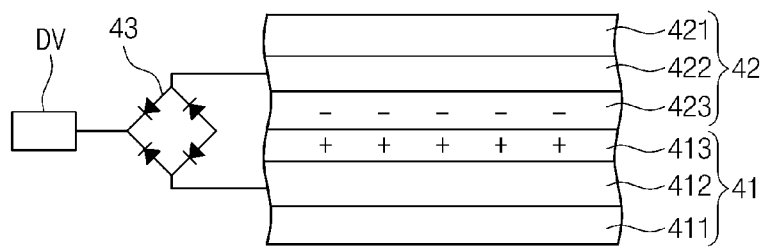
FIGS. 4A to 4E are views showing another process of producing a triboelectricity by an exemplary embodiment of an energy generating module when a frictional event occurs, according to the invention.

Referring to FIG. 4A, in an exemplary embodiment, the second electrified substrate 42 may be disposed to be in contact with the first electrified substrate 41. The first and second frictional surfaces 41S and 42S are electrified due to the contact therebetween to have different polarities from each other. In one exemplary embodiment, for example, the first frictional surface 41S is electrified to have the positive (+) electric charge, and the second frictional surface 42S is electrified to have the negative (−) electric charge.

Figure 4B:
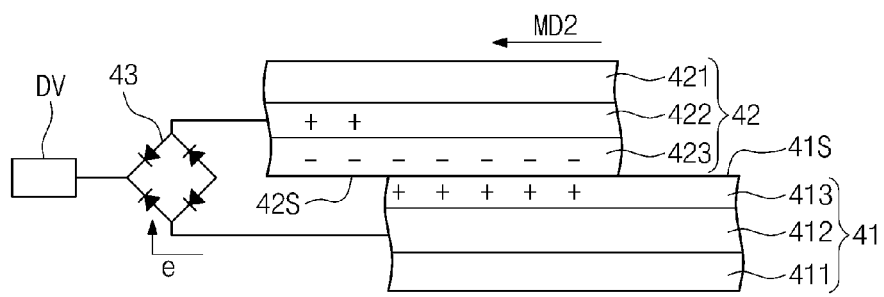

Referring to FIG. 4B, the second electrified substrate 42 may move in a direction substantially perpendicular to a thickness direction thereof, e.g., in the left-and-right direction MD2, by the frictional event. The second electrified substrate 42 relatively may move in the left direction with respect to the first electrified substrate 41. In such an embodiment, the first and second electrified substrates 41 and 42 may relatively move in opposite directions from each other while being in contact with each other.

When the second electrified substrate 42 moves in the left direction, a portion of the second frictional surface 42S is not in contact with the first frictional surface 41S. Since the second electrified layer 423 includes an insulating material electrically insulated from the second conductive layer 422, the electrons existing on the second frictional surface 42S may continuously exist even though the second frictional surface 42S is not in contact with the first frictional surface 41S.

Accordingly, the portion of the second electrified substrate 42, which does not make contact with the first electrified substrate 41, has an electric potential lower than the first electrified substrate 41. The energy generating module 40 makes the free electrons of the first conductive layer 412 move to the outside of the first conductive layer 412 such that the first and second electrified substrates 41 and 42 are electrically balanced to each other.

The free electrons output from the first conductive layer 412 may move through a conducting wire. Accordingly, due to the triboelectricity caused by the friction along the left-and-right direction MD2, a current flowing from the second electrified substrate 42 to the first electrified substrate 41 is produced. The current continuously flows until the first and second electrified substrates 41 and 42 of the energy generating module 40 are electrically balanced to each other.

Figure 4C:
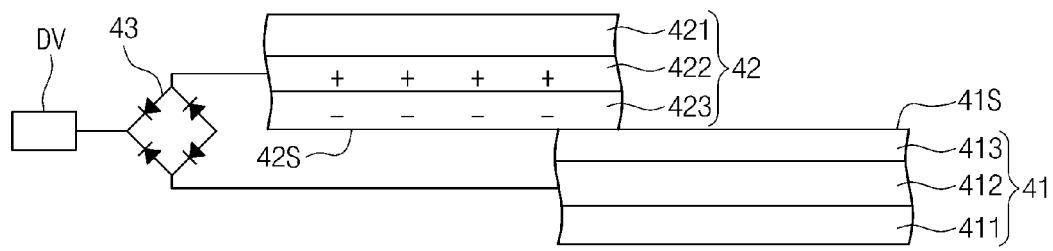

When a predetermined time lapses after the second electrified substrate 42 moves in the left direction as shown in FIG. 4C, an amount of the electrons flowing from the first electrified substrate 41 to the second electrified substrate 42 is reduced and the energy generating module 40 is electrically stabilized.

Figure 4D:
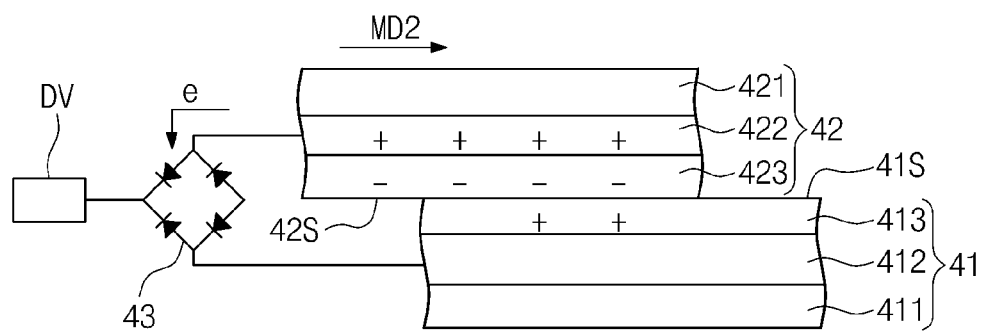

Then, the second electrified substrate 42 may further move in the left-and-right direction MD2 by the frictional event as shown in FIG. 4D. In one exemplary embodiment, for example, the second electrified substrate 42 relatively moves in the right direction with respect to the first electrified substrate 41, as shown in FIG. 4D.

Therefore, the area in which the second frictional surface 42S makes contact with the first frictional surface 41S increases. The positive (+) electric charge is induced in the portion of the first frictional surface 41S, which makes contact with the second frictional surface 42S.

When the contact area between the first and second frictional surfaces 41S and 42S is increased, the electric potential of the second frictional surface 42S increases. Thus, when the contact area between the second frictional surface 42S and the first frictional surface 41S increases, the second electrified substrate 42 make the free electrons of the second conductive layer 422 move to the outside of the second conductive layer 422, and thus the second electrified substrate 42 is electrically stabilized.

The free electrons output from the second conductive layer 422 move through a conducting wire, such that a current flowing from the first electrified substrate 41 to the second electrified substrate 42 is produced. The current continuously flows until the first and second electrified substrates 41 and 42 of the energy generating module 40 are electrically balanced to each other.

Figure 4E:
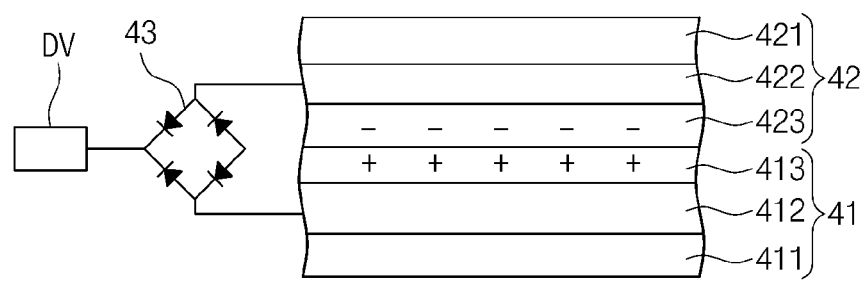

When a predetermined time lapses after the second electrified substrate 42 moves in the right direction as shown in FIG. 4E, an amount of the electrons flowing from the second electrified substrate 42 to the first electrified substrate 41 is reduced and the energy generating module 40 is electrically stabilized.

Although not shown in figures, when the frictional event shown in FIG. 4B may repeatedly occur and the energy generating module 40 is repeatedly operated in modes shown in FIGS. 4B to 4E, the triboelectricity having an available electric energy may be produced.

The energy generating module 40 may produce the triboelectricity having the electric energy varied depending on the number and speed of frictions in the left-and-right direction MD2. In such an embodiment, the electric energy of the triboelectricity becomes higher as the number of the frictions becomes higher and as the speed of the frictions becomes faster.

Figure 5A:
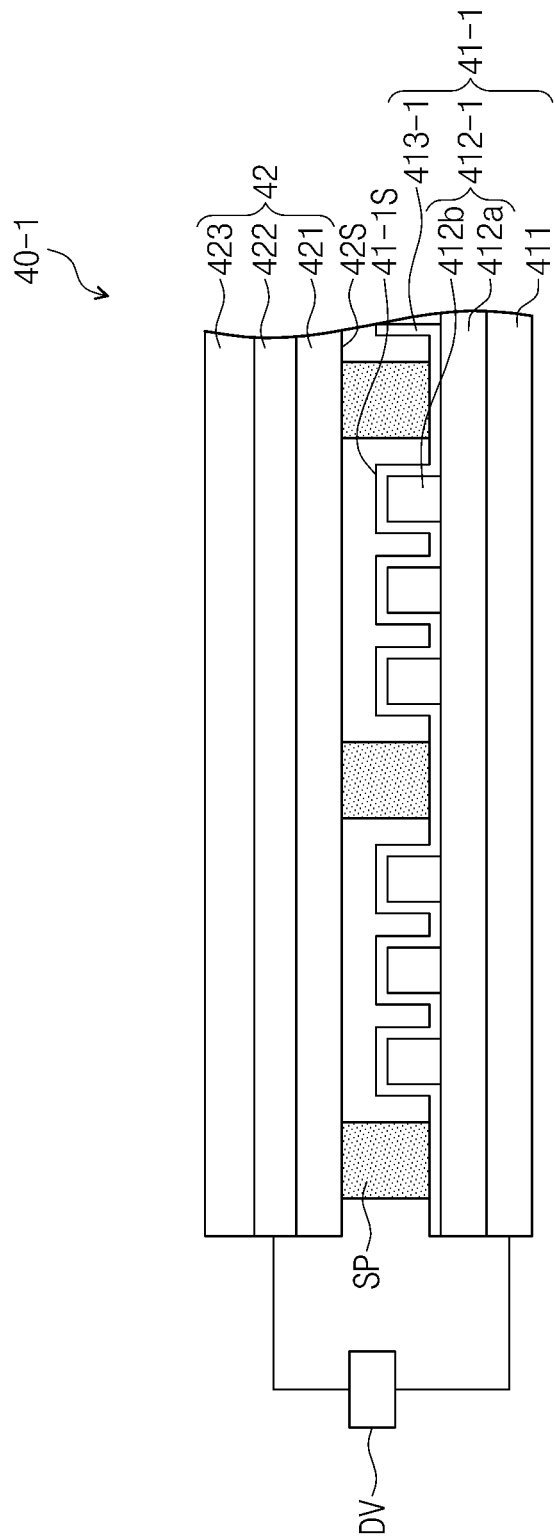
FIGS. 5A to 5C are cross-sectional views showing an exemplary embodiment of an energy generating module according to the invention.
Figure 5B:
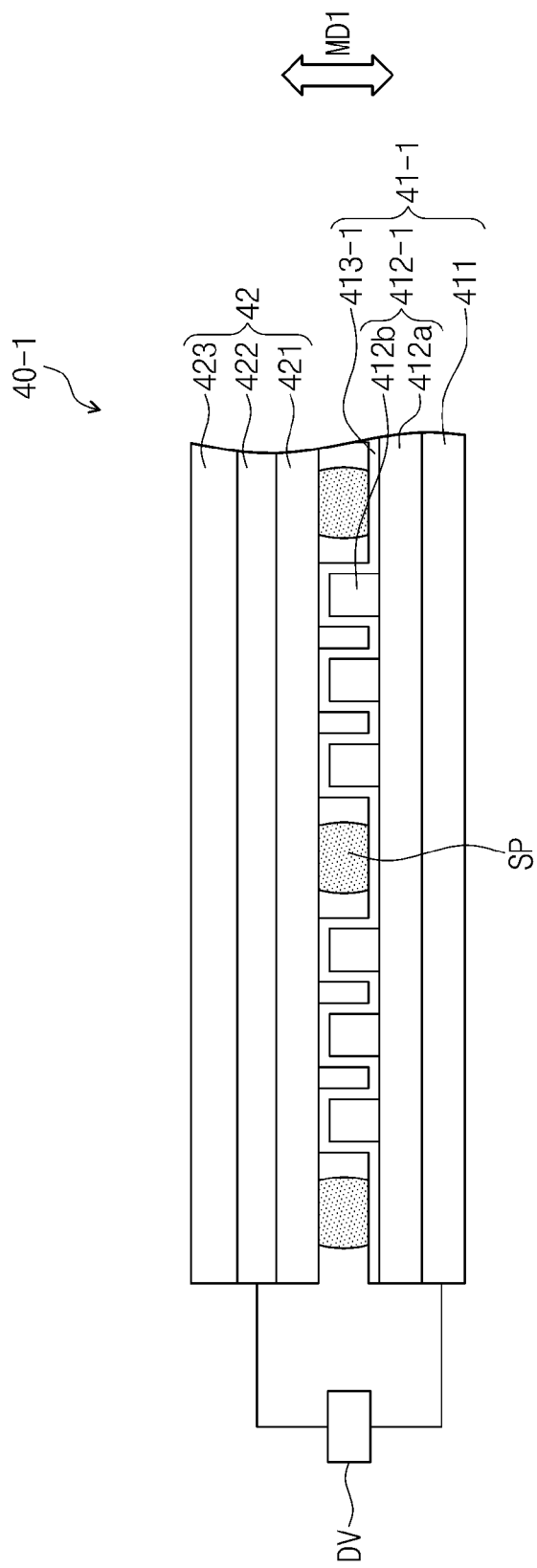
Figure 5C:
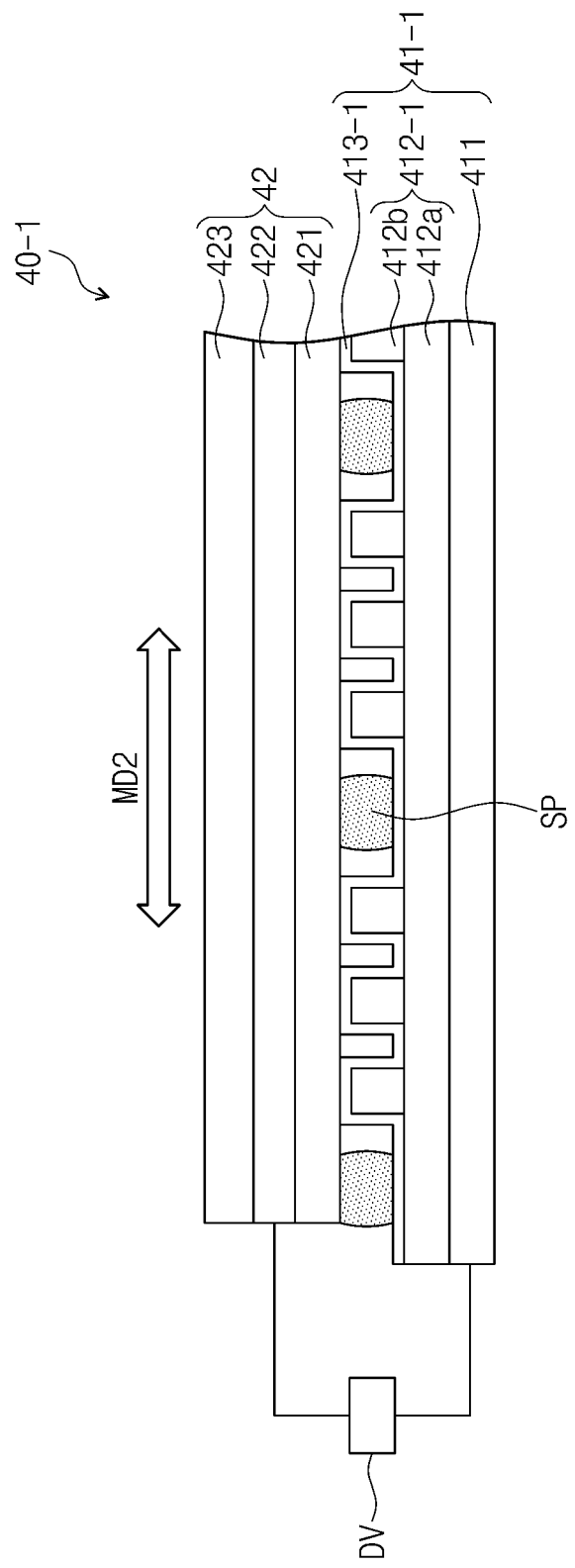

FIGS. 5A to 5C are cross-sectional views showing an exemplary embodiment of an energy generating module according to the invention. FIG. 5A shows an energy generating module 40-1 before the frictional event occurs and FIGS. 5B and 5C show the energy generating module 40-1 when the frictional event occurs.

Hereinafter, an exemplary embodiment of the energy generating module 40-1 will be described in detail with reference to FIGS. 5A to 5C. The energy generating module 40-1 in FIGS. 5A to 5C is substantially the same as the energy generating module shown in FIGS. 3A to 4E except for the first electrified substrate and a spacer. The same or like elements shown in FIGS. 5A to 5C have been labeled with the same reference characters as used above to describe exemplary embodiments of the energy generating module with reference to FIGS. 3A to 4E, and any repetitive detailed description thereof will hereinafter be omitted or simplified.

Referring to FIG. 5A, in an exemplary embodiment of the energy generating module 40-1, a first electrified substrate 41-1 includes a first base substrate 411, a first conductive layer 412-1 disposed on the first base substrate 411, and a first electrified layer 413 disposed on the first conductive layer 412-1. The first conductive layer 412-1 includes a base layer 412a and a plurality of conductive patterns 412b.

The base layer 412a may be disposed on a surface of the first base substrate 411 to cover the entire surface of the first base substrate 411. The base layer 412a may include or be formed of a conductive material.

In an exemplary embodiment, the conductive patterns 412b may be disposed on the base layer 412a. Each of the conductive patterns 412b may have a predetermined shape, e.g., one of various shapes, including a polygonal column shape, a circular column shape, a polygonal pyramid shape, a circular pyramid shape, a spherical shape and a dome shape, for example. In such an embodiment, the conductive patterns 412b may be configured to include a plurality of nano-particles or a plurality of nano-rods. In one exemplary embodiment, for example, each of the conductive patterns 412b has a square column shape.

The conductive patterns 412b may include or be formed of a conductive material. The conductive patterns 412b may include substantially the same material as that of the base layer 412a.

In an exemplary embodiment, the conductive patterns 412b are electrically connected to the base layer 412a. In such an embodiment, the first conductive layer 412-1 may have a shape obtained by integrally connecting the base layer 412a and the conductive patterns 412b.

A first electrified layer 413-1 may be disposed on the first conductive layer 412-1. The first electrified layer 413-1 may cover the base layer 412a and the conductive patterns 412b.

The first electrified layer 413-1 may include a first frictional surface 41-1S. The first frictional surface 41-1S is defined on a surface of the first electrified layer 413-1, which faces the second electrified substrate 42. The first frictional surface 41-1S may make contact with the second electrified substrate 42 by the frictional event.

In an exemplary embodiment, the first frictional surface 41-1S is disposed to correspond to, e.g., overlap, the conductive patterns 412b. The conductive patterns 412b are protruded from an upper surface of the base layer 412a, and thus the portions of the first frictional surface 41-1S, which corresponds to the conductive patterns 412b, may be effectively make contact with the second electrified substrate 42 when the first electrified substrate 41-1 is relatively moved to the second electrified substrate 42. In an exemplary embodiment, the first electrified layer 413-1 may be configured to include a plurality of layers, and the first frictional surface 41-1S is defined on a layer of the layers, which is disposed to closest to the second electrified substrate 42.

The second electrified substrate 42 includes a second base substrate 421, a second conductive layer 422 and a second electrified layer 423. The second electrified layer 423 includes a second frictional surface 42S defined on a surface thereof, which faces the first electrified substrate 41-1. In such an embodiment, the second electrified substrate 42 has substantially the same structure and function as those of the second electrified substrate 42 shown in FIGS. 3A to 3E and 4A to 4E, any repetitive detailed description thereof will be omitted.

The energy generating module 40-1 includes a spacer SP, e.g., a plurality of spacers SP. The spacer SP is disposed between the first electrified substrate 41-1 and the second electrified substrate 42.

The spacer SP is disposed on the first electrified layer 413 to be adjacent to the conductive patterns 412b. The spacer SP may not overlap the conductive patterns 412b. The spacer SP may be disposed between adjacent conductive patterns 412b.

The first frictional surface 41-1S may be spaced apart from the second frictional surface 42S by a distance varied depending on a height of the spacer SP. As the height of the spacer SP becomes smaller, the distance between the first and second frictional surfaces 41-1S and 42S becomes smaller. As the distance between the first and second frictional surfaces 41-1S and 42S becomes smaller, a sensitivity of the energy generating module 40-1 against the frictional event is improved.

The spacer SP may be attached or fixed to the first electrified substrate 41-1 or the second electrified substrate 42. In an exemplary embodiment, the spacer PS is attached to the first frictional surface 41-1S or the second frictional surface 42S. The spacer SP moves together with the first electrified substrate 41-1 or the second electrified substrate 42, to which the spacer SP is fixed.

The spacer SP includes an insulating material having elasticity, e.g., polyurethane, rubber, elastomer, silicon, etc.

As shown in FIG. 5B, when the frictional event occurs on the energy generating module 40-1, the friction may occur on the energy generating module 40-1 along the upper-and-lower direction MD1. The frictional event shown in FIG. 5B corresponds to the frictional event shown in FIGS. 3A to 3E.

When the friction may occur on the energy generating module 40-1 along the upper-and-lower direction MD1, the second electrified substrate 42 may move in the lower direction, thereby being disposed adjacent to the first electrified substrate 41-1. Accordingly, the height of the spacer SP is decreased and the second frictional surface 42S makes contact with the first frictional surface 41-1S. Then, the second electrified substrate 42 may move in the upper direction and the second electrified substrate 42 is spaced farther away from the first electrified substrate 41-1.

In such an embodiment, when the external force that causes the frictional event is applied to only the lower direction, the second electrified substrate 42 returns to an original position thereof by the elasticity of the spacer SP when the external force disappears. Accordingly, the energy generating module 40-1 may produce the triboelectricity with respect to the frictional event caused by the external force applied to a single direction, e.g., the lower direction.

As shown in FIG. 5C, in an exemplary embodiment, when the frictional event occurs on the energy generating module 40-1 in the left-and-right direction MD2, the friction occurs on the energy generating module 40-1 in the left-and-right direction MD2. The frictional event shown in FIG. 5C corresponds to the frictional event shown in FIGS. 4A to 4E.

When such a friction event occurs, the second electrified substrate 42 makes contact with the first electrified substrate 41-1. That is, the friction in the left-and-right direction MD2 and the friction in the upper-and-lower direction MD1 substantially simultaneously occur on the energy generating module 40-1 shown in FIG. 5C. The energy generating module 40-1 produces the triboelectricity using the frictions operated to the energy generating module 40-1 in various directions.

In one exemplary embodiment, for example, when the frictional event occurs by the external force applied to the energy generating module 40-1 along various directions, the friction in the left-and-right direction MD2 and the friction in the upper-and-lower direction MD1 substantially simultaneously occur on the energy generating module 40-1. In addition, when the energy generating module 40-1 is assembled to the display device DS (refer to FIG. 1B) while the second electrified substrate 42 makes contact with the first electrified substrate 41-1 due to other elements, the frictions occurs in various directions.

As shown in FIG. 5C, when the second electrified substrate 42 relatively moves in the left or right direction with respect to the first electrified substrate 41-1, the friction occurs in the left-and-right direction MD2. When the friction occurs in the left-and-right direction MD2, the spacer SP may be fixed to the first electrified substrate 41-1 to allow the second electrified substrate 42 to effectively move.

Figure 6A:
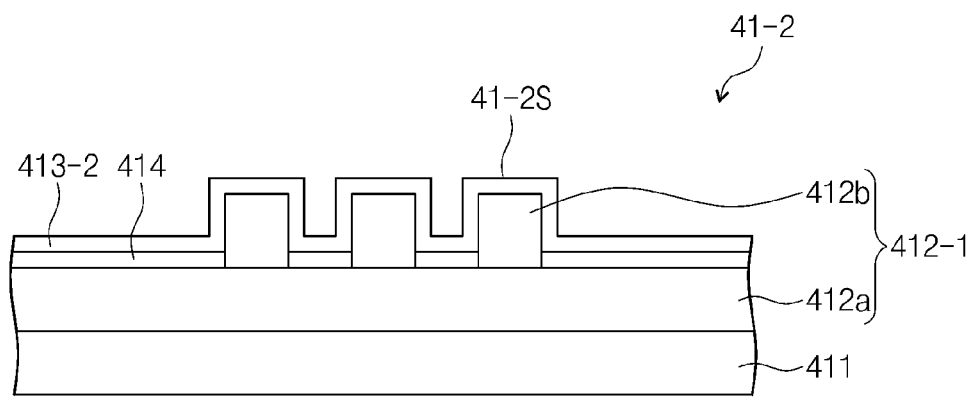
FIG. 6A is a cross-sectional view showing an exemplary embodiment of a first electrified substrate according to the invention.
Figure 6B:
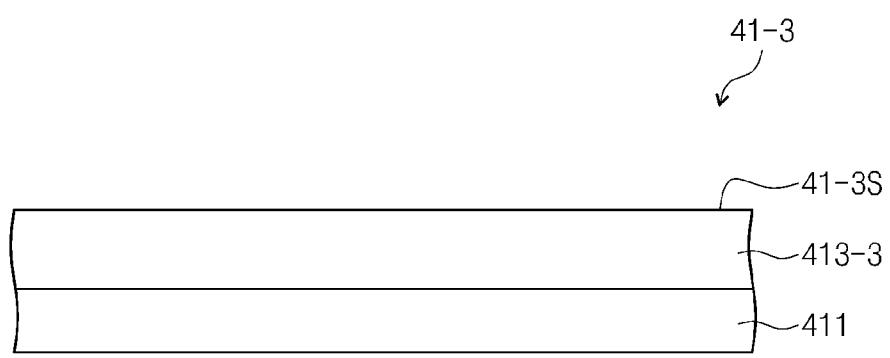
FIG. 6B is a cross-sectional view showing a portion of an exemplary embodiment of a first electrified substrate according to the invention.

FIG. 6A is a cross-sectional view showing an exemplary embodiment of a first electrified substrate 41-2 according to the invention, and FIG. 6B is a cross-sectional view showing a portion of an exemplary embodiment of a first electrified substrate 41-3 according to the invention. The same or like elements shown in FIGS. 6A and 6B have been labeled with the same reference characters as used above to first electrified substrate with reference to FIGS. 1 to 5C, and any repetitive detailed description thereof will hereinafter be omitted or simplified.

Referring to FIG. 6A, an exemplary embodiment of the first electrified substrate 41-2 further includes an intermediate layer 414. The intermediate layer 414 may be disposed between the first conductive layer 412-1 and the first electrified layer 413-2.

The intermediate layer 414 may be disposed on the base layer 412a. The intermediate layer 414 and the conductive patterns 412b may be disposed on a same layer and adjacent to each other. In such an embodiment, the intermediate layer 414 is disposed between the conductive patterns 412b when viewed in a cross-sectional view. The intermediate layer 414 may not overlap the conductive patterns 412b when viewed in a plan view.

In an exemplary embodiment, the intermediate layer 414 covers areas of the base layer 412a, which are exposed through the conductive patterns 412b. Therefore, in such an embodiment, the entire surface of the base layer 412a may be covered by the conductive patterns 412b and the intermediate layer 414.

The intermediate layer 414 includes an insulating material that is electrically insulated. In an exemplary embodiment, the intermediate layer 414 includes substantially the same material as that of the second electrified layer 423 (refer to FIG. 5A). In one exemplary embodiment, for example, the intermediate layer 414 and the second electrified layer 423 include or are formed of an epoxy resin.

In such an embodiment, the first electrified layer 413-2 covers the intermediate layer 414 and the conductive patterns 412b. The first electrified layer 413-2 may include a first frictional surface 41-2S having protruding patterns respectively corresponding to the conductive patterns 412b. In an exemplary embodiment, the first frictional surface 41-2S has substantially the same shape as that of the first frictional surface 41-1S shown in FIG. 5A.

Referring to FIG. 6B, an exemplary embodiment of the first electrified substrate 41-3 may include the first base substrate 411 and the first electrified layer 413. The first electrified substrate 41-3 includes a first frictional surface 41-3S defined on a surface thereof. The first frictional surface 41-3S may be relatively flat compared to the first frictional surface 41-3S shown in FIG. 6A.

In an exemplary embodiment, the first conductive layer 412 may be omitted. Thus, the first electrified layer 413 may be directly disposed on the first base substrate 411. In an alternative exemplary embodiment, the first electrified layer 413 may be integrally formed with the first conductive layer 412 as a single unitary and indivisible unit.

The first electrified layer 413 may substantially simultaneously perform various functions of providing the first frictional surface 41-3S, and discharging the electrons to the outside or accommodating the electrons from the outside when the frictional event occurs to achieve the electrical balance state.

Figure 7A:
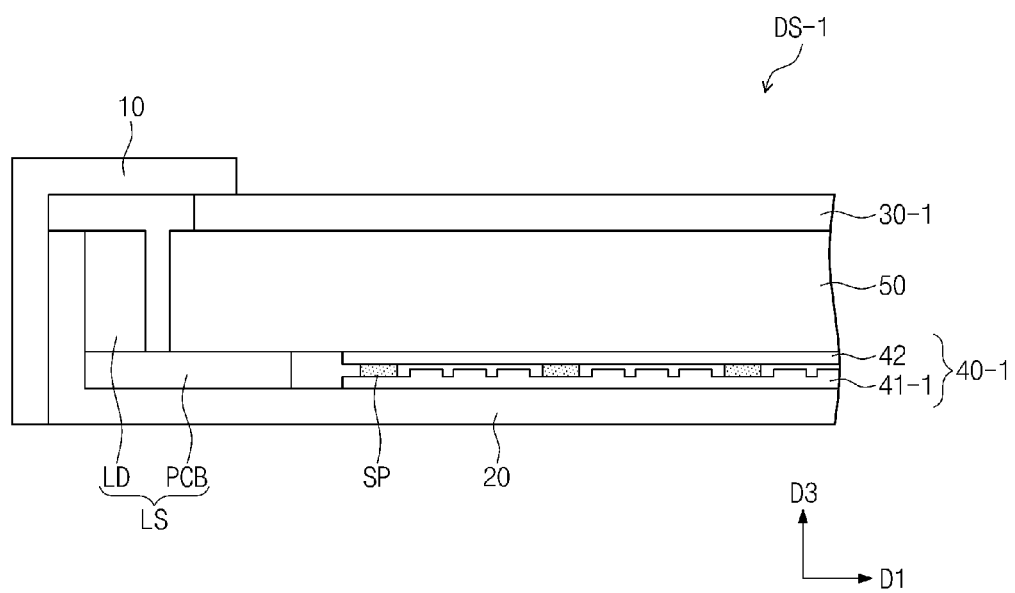
FIGS. 7A to 7C are cross-sectional views showing an exemplary embodiment of a display device according to the invention.
Figure 7B:
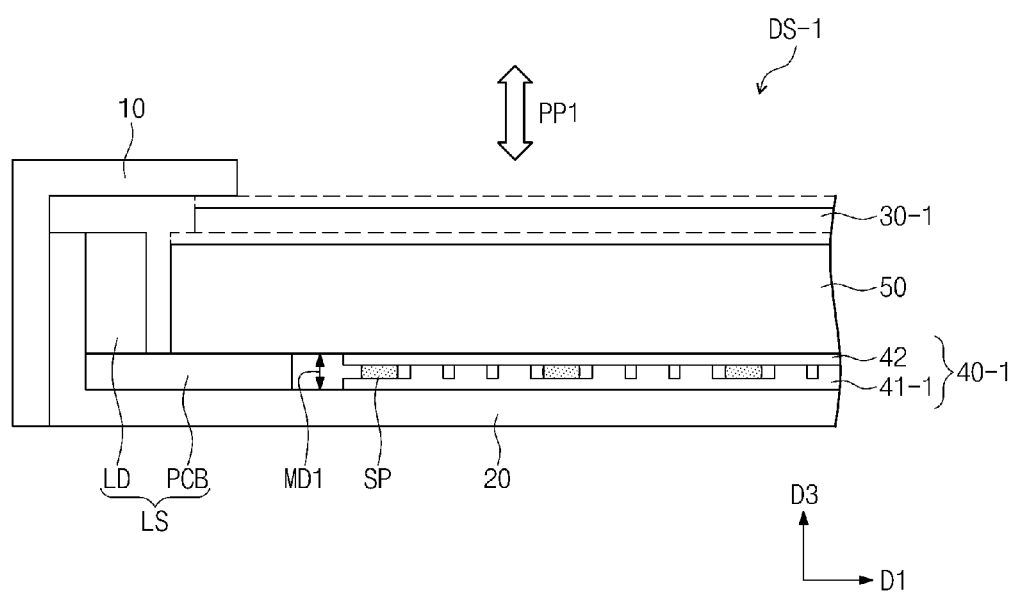
Figure 7C:
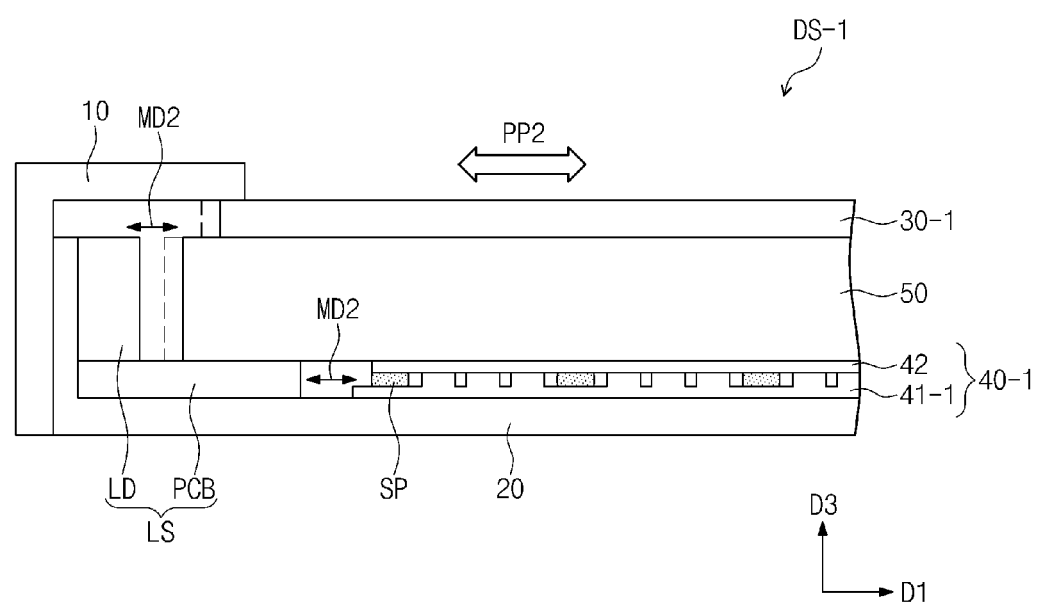

FIGS. 7A to 7C are cross-sectional views showing an exemplary embodiment of a display device DS-1 according to the invention. FIG. 7A shows the display device DS-1 before the frictional event occurs, and FIGS. 7B and 7C show the display device DS-1 when the frictional event occurs.

Referring to FIG. 7A, an exemplary embodiment of the display device DS-1 includes an upper protection member 10, a display panel 30-1, an energy generating module 40-1, a lower protection member 20, a light source LS and an optical member (also referred to as "optical plate") 50. The upper and lower protection members 10 and 20 are substantially the same as the accommodating member 10 and 20 shown in FIGS. 1A and 1B, and any repetitive detailed description thereof will be omitted.

In an exemplary embodiment, the display panel 30-1 may be, but not limited to, a liquid crystal display panel. The light source LS and the optical member 50 are disposed between the lower protection member 20 and the display panel 30-1. The light source LS emits light to the optical member 50, and the optical member 50 provide the light from the light source LS to the display panel 30-1.

The light source LS includes a light emitting device LD and a printed circuit board PCB. The light emitting device LD emits the light. The light emitting device LD includes a cold cathode fluorescent lamp or a light emitting diode.

The light emitting device LD is disposed on at least one of a bottom portion 20B of the lower protection member 20 or sidewalls 20H of the lower protection member 20. In an alternative exemplary embodiment, the light emitting device LD is disposed on the bottom portion 20B, and the light emitting device LD is disposed on the energy generating module 40-1.

The printed circuit board PCB is connected to the light emitting device LD to apply a voltage source to the light emitting device LD. The printed circuit board PCB is disposed on the bottom portion 20B. In an exemplary embodiment, the printed circuit board PCB may have a thickness equal to or smaller than a thickness of the energy generating module 40-1.

In an exemplary embodiment, the printed circuit board PCB is disposed adjacent to the energy generating module 40-1 on a same plane surface (e.g., on in a same level from a bottom surface of the lower protection member 20. The triboelectricity generated by the energy generating module 40-1 may be applied to the printed circuit board PCB and used to drive the light emitting device LD.

The optical member 50 may be disposed between the energy generating module 40-1 and the display panel 30-1. In an exemplary embodiment, the optical member 50 may be a light guide plate that receives the light provided from the light emitting device LD disposed on the sidewalls 20H and guides the light to the display panel 30-1.

In an exemplary embodiment, the energy generating module 40-1 may have a structure corresponding to that of the energy generating module shown in FIGS. 5A to 5C. In such an embodiment, the energy generating module 40-1 includes a first electrified substrate 41-1 including a plurality of protruding patterns defined therein and a second electrified substrate 42.

The first electrified substrate 41-1 may be fixed to the bottom portion 20B and move together with the accommodating member 10 and 20. The second electrified substrate 42 may be fixed to the optical member 50 and moves together with the optical member 50. Accordingly, in such an embodiment, the energy generating module 40-1 produces the triboelectricity based on the relative movement of the optical member 50 with respect to the accommodating member 10 and 20.

In one exemplary embodiment, for example, as shown in FIG. 7B, when the external force PP1 is applied to the display device DS-1 along the third direction D3, the frictional event occurs on the display device DS-1. Due to the frictional event, the display panel 30-1 and the optical member 50 move in the third direction D3.

The display panel 30-1 and the optical member 50 before moving are indicated by a dotted line in FIG. 7B. The display panel 30-1 and the optical member 50 relatively move in the upper-and-lower direction MD1 by the frictional event as shown in FIG. 7B. In such an embodiment, although the thickness of the printed circuit board PCB may not be reduced, the movement of the display panel 30-1 and the optical member 50 is reflected to the energy generating module 40-1.

Thus, when the display panel 30-1 and the optical member 50 move in the third direction D3, the friction may occur on the energy generating module 40-1 in the upper-and-lower direction MD1. The first electrified substrate 41-1, which is spaced apart from the second electrified substrate 42 by the spacer SP, makes contact with the second electrified substrate 42 and then is spaced apart from the second electrified substrate 42 by the elasticity of the spacer SP. When the contact and separation between the first and second electrified substrates 41-1 and 42 are repeated, the energy generating module 40-1 produces the triboelectricity corresponding to the contact and separation between the first and second electrified substrates 41-1 and 42.

As shown in FIG. 7C, when the external force PP2 is applied to the display device DS-1 along the first direction D1, the frictional event occurs on the display device DS-1. The display panel 30-1 and the optical member 50 before moving are indicated by a dotted line in FIG. 7C. Due to the frictional event, the display panel 30-1 and the optical member 50 move in the first direction D1.

Accordingly, when the display panel 30-1 and the optical member 50 move in the first direction D1, the friction occurs on the energy generating module 40-1 along the left-and-right direction MD2. The second electrified substrate 42 moves in the left or right direction of the first electrified substrate 41-1 while making contact with the first electrified substrate 41-1. The energy generating module 40-1 produces the triboelectricity using the frictions in the left-and-right direction MD2.

Figure 8A:
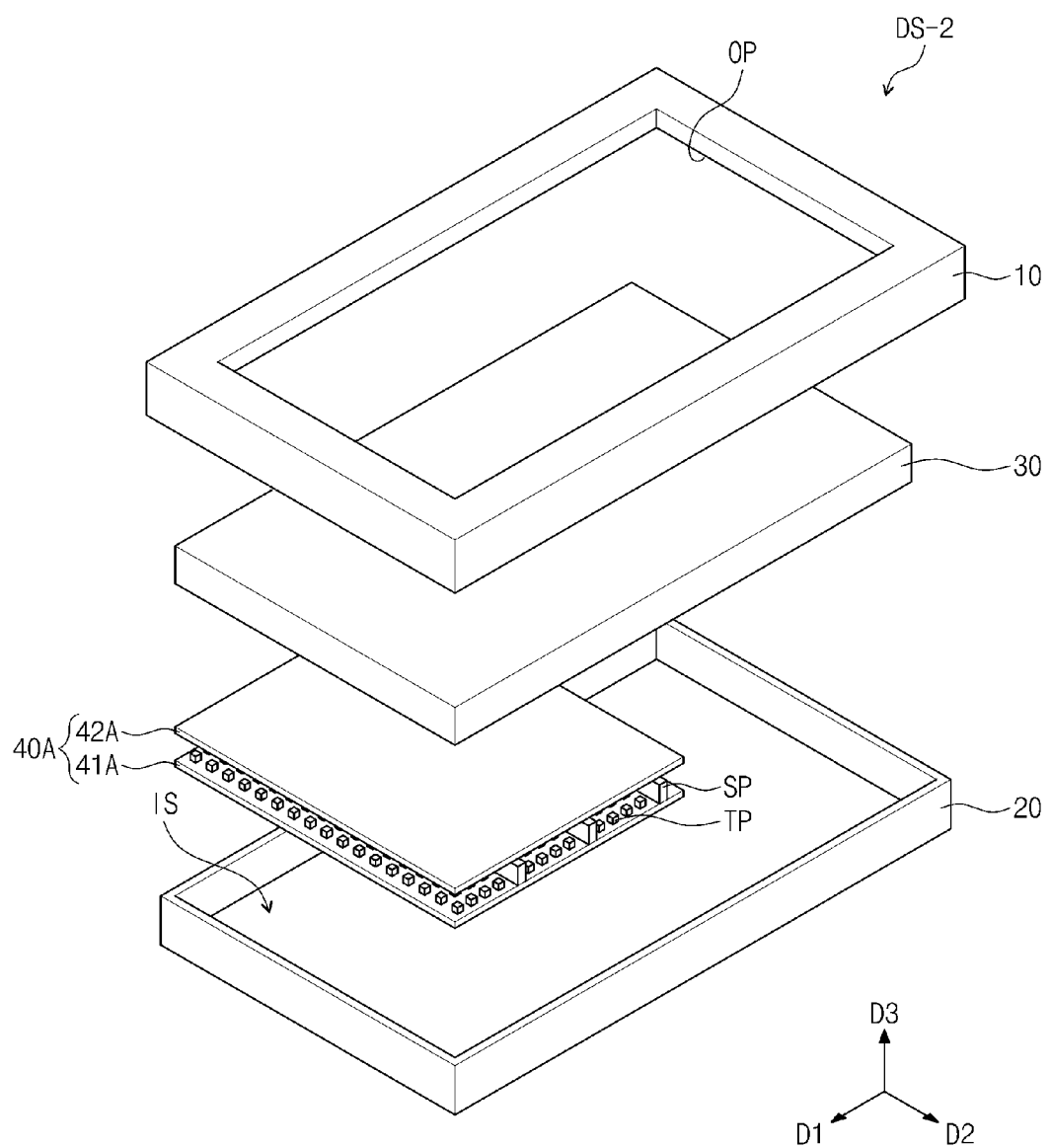
FIG. 8A is an exploded perspective view showing an alternative exemplary embodiment of a display device according to the invention.
Figure 8B:
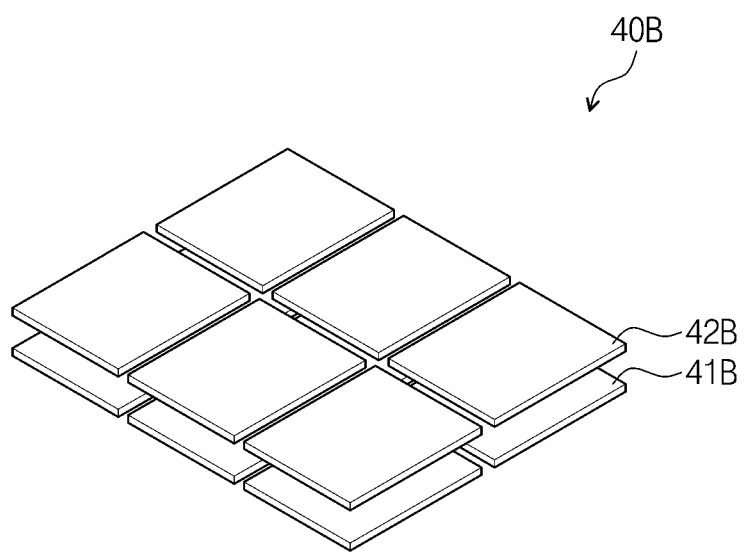
FIG. 8B is a perspective view showing an alternative exemplary embodiment of an energy generating module according to the invention.

FIG. 8A is an exploded perspective view showing an alternative exemplary embodiment of a display device DS-2 according to the invention and FIG. 8B is a perspective view showing an alternative exemplary embodiment of an energy generating module 40A according to the invention. The display device DS-2 shown in FIGS. 8A and 8B has substantially the same structure and function as those of the display device shown in FIGS. 1A to 7C except for the energy generating module 40A. The same or like elements shown in FIGS. 8A and 8B have been labeled with the same reference characters as used above to describe exemplary embodiments of the display device with reference to FIGS. 1A to 7C, and any repetitive detailed description thereof will hereinafter be omitted or simplified.

Referring to FIG. 8A, an exemplary embodiment of the display device DS-2 includes an upper protection member 10, a lower protection member 20, a display panel 30 and the energy generating module 40A. The upper protection member 10, the lower protection member 20 and the display panel 30 correspond to the upper protection member 10, the lower protection member 20 and the display panel 30 shown in FIGS. 1A and 1B, respectively.

The energy generating module 40A has substantially the same structure and function as those of the energy generating module 40 shown in FIG. 1A except for the size of the energy generating module 40A.

As shown in FIG. 8A, in an exemplary embodiment, the energy generating module 40A may have various sizes. The energy generating module 40 may have a size smaller than a predetermined size to be accommodated in the accommodating member 10 and 20.

The energy generating module 40A may include a first electrified substrate 41A and a second electrified substrate 42A disposed on the first electrified substrate 41A. The first electrified substrate 41A may include a plurality of electrified patterns TP. The first electrified substrate 41A corresponds to the first electrified substrate 41-1 shown in FIG. 5A.

In an exemplary embodiment, a distance between the electrified patterns TP should not be limited to a specific value. In such an embodiment, an electricity production efficiency of the energy generating module 40A is varied depending on the distance between the electrified patterns TP and an area of the electrified patterns TP in a plan view.

In an exemplary embodiment, the first electrified substrate 41A includes a plurality of spacers SP. The spacers SP have a height greater than that of the electrified patterns TP. According to another exemplary embodiment, the spacers SP may be disposed on the second electrified substrate 42A.

Referring to FIG. 8B, the energy generating module may be configured to include a plurality of energy generating modules 40B. In one exemplary embodiment, for example, the energy generating module includes six energy generating modules 40B, as shown in FIG. 8B.

In an exemplary embodiment, the energy generating module includes a plurality of first electrified substrates 41B and a plurality of second electrified substrates 42B. The energy generating modules 40B are connected to each other in a predetermined manner, which may be one of various ways. In one exemplary embodiment, for example, the energy generating modules 40B are connected to each other in series or in parallel. Although not shown in figures, the energy generating modules 40B may be accommodated in the accommodating member 10 and 20 after being stacked one on another.

FIGS. 9A to 9G are cross-sectional views showing an exemplary embodiment of a method of manufacturing an energy generating module according to the invention. The same or like elements shown in FIGS. 9A to 9G have been labeled with the same reference characters as used above to describe exemplary embodiments of the energy generating module with reference to FIGS. 1A to 7C, and any repetitive detailed description thereof will hereinafter be omitted or simplified.

Figure 9A:
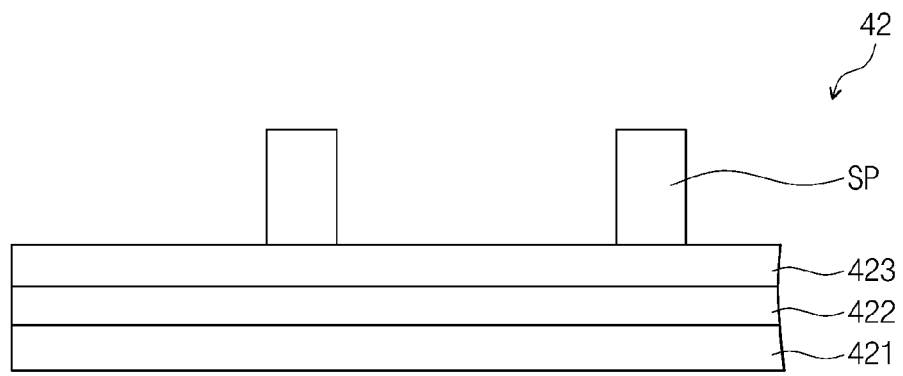
FIGS. 9A to 9G are cross-sectional views showing an exemplary embodiment of a method of manufacturing an energy generating module, according to the invention.

Hereinafter, an exemplary embodiment of the manufacturing process of the second electrified substrate 42 will be described with reference to FIG. 9A. Referring to FIG. 9A, the second conductive layer 422 is provided, e.g., formed, on the second base substrate 421. The second conductive layer 422 may be formed on the second base substrate 421 by a spin coating, depositing, or sputtering process, for example.

The second electrified layer 423 is provided on the second conductive layer 422. The second electrified layer 423 may be formed on the second conductive layer 422 by coating or depositing a material having electrification property on the second conductive layer 422, for example.

In an exemplary embodiment, the second conductive layer 422 may be formed by processes similar to a method of forming a conventional printed circuit board. In one exemplary embodiment, for example, the second conductive layer 422 includes substantially the same material as that of conductive lines that may be applied to circuits mounted on the conventional printed circuit board. In one exemplary embodiment, for example, the second conductive layer 422 is formed of copper (Cu), gold (Au), or silver (Ag).

The second electrified layer 423 includes substantially the same material as that of an insulating layer covering a surface of the printed circuit board to effectively insulate the conductive lines from other conductive parts, that is, to effectively prevent the conductive lines from electrically making contact with the other conductive parts. In one exemplary embodiment, for example, the second electrified layer 423 includes the epoxy-based resin.

Accordingly, the second electrified substrate 42 may be formed by the processes similar to the process of forming the conventional printed circuit board. Therefore, in such an embodiment, a conventional process line may be used to produce the second electrified substrate 42, and thus additional manufacturing cost for the energy generating module may be substantially reduced or effectively minimized.

Then, the spacer SP is provided on the second electrified substrate 42. The spacer SP may be formed by printing the insulating material having elasticity on the second electrified layer 423 or patterning the insulating material formed on the second electrified layer 423 using a photolithography process, for example. However, according to another exemplary embodiment, the spacer SP may be formed on the first electrified substrate 41-2 described below.

Hereinafter, an exemplary embodiment of the manufacturing process of the first electrified substrate 41-2 will be described with reference to FIGS. 9B to 9F. The first electrified substrate 41-2 corresponds to the first electrified substrate 41-2 show in FIG. 6A.

Figure 9B:
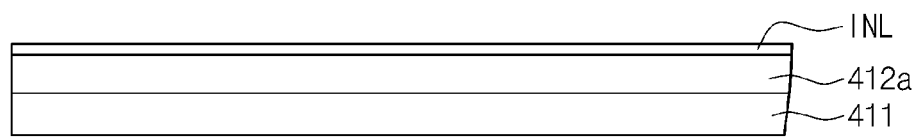

Referring to FIG. 9B, the base layer 412*a* is provided on the first base substrate 411. The base layer 412*a* is formed on the first base substrate 411 by a spin coating, depositing, or sputtering process, for example.

An insulating layer INL is provided on the base layer 412*a*. The insulating layer INL includes an inorganic or organic material. The insulating layer INL may be formed on the base layer 412*a* by a spin coating, depositing, or sputtering process, for example.

In an exemplary embodiment, the first base substrate 411, the base layer 412*a* and the insulating layer INL may have substantially the same structure as those of the second electrified substrate 42, and may be formed through substantially the same process as those of the second electrified substrate 42. In such an embodiment, the first electrified substrate 41-2 may be formed using the substrate having substantially the same structure as the conventional printed circuit board or the second electrified substrate 42, such that the manufacturing cost may be reduced.

Figure 9C:
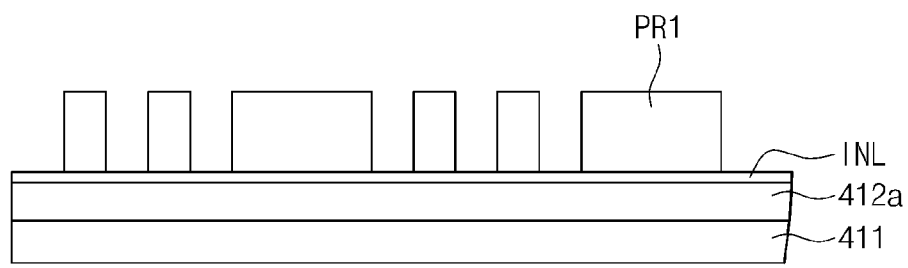

Referring to FIG. 9C, a photoresist pattern PR1 is provided on the insulating layer INL. The photoresist pattern PR1 may be formed by forming a photoresist layer (not shown) on the insulating layer INL and patterning the photoresist layer through a photolithography process.

The photoresist pattern PR1 exposes portions of the insulating layer INL. The photoresist pattern PR1 corresponds to the shape of the intermediate layer 414 to be provided thereon as described below when viewed in a plan view.

Figure 9D:
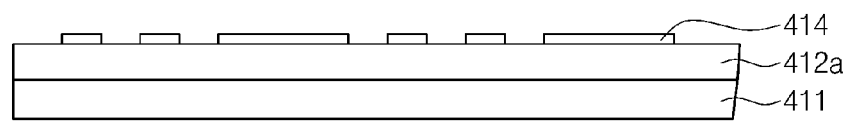

Referring to FIGS. 9C and 9D, the intermediate layer 414 is provided on the base layer 412*a* through an etch process. The intermediate layer 414 may be formed on the base layer 412*a* by removing the portions exposed through the photoresist pattern PR1, for example.

Accordingly, the intermediate layer 414 exposes portions of the base layer 412*a*, which correspond to the portions of the insulating layer INL. Then, the photoresist pattern PR1 is removed from the intermediate layer 414, e.g., using a strip process.

Figure 9E:
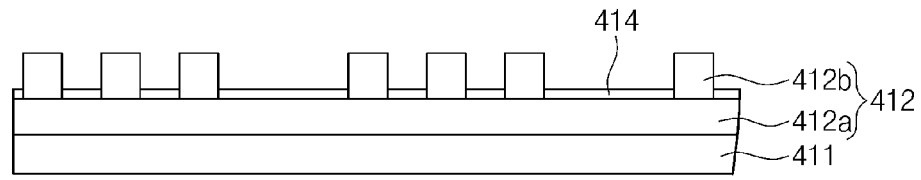

Referring to FIG. 9E, the conductive patterns 412*b* are provided on the base layer 412*a*. The conductive patterns 412*b* may be formed on the portions of the base layer 412, which are exposed through the intermediate layer 414. The conductive patterns 412*b* may include substantially the same material as that of the base layer 412*a*.

The conductive patterns 412*b* may be formed through various methods. In an exemplary embodiment, the conductive patterns 412*b* may be formed by printing the conductive material on the portions of the base layer 412*a*. The base layer 412*a* is electrically connected to the conductive patterns 412*b* to form the first conductive layer 412.

Figure 9F:
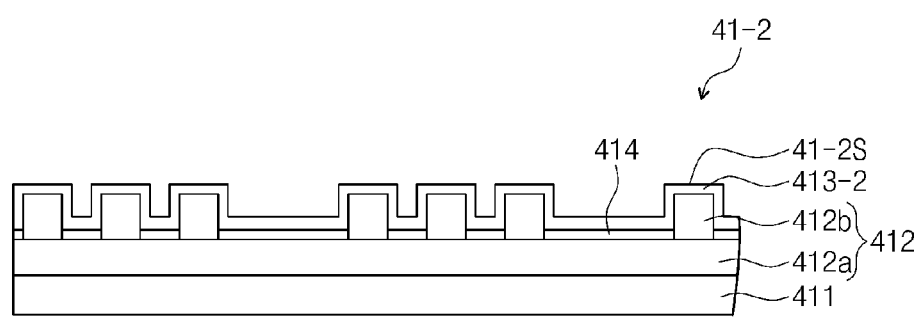

Referring to FIG. 9F, the first electrified layer 413-2 is provided on the first conductive layer 412. The first electrified layer 413-2 may be formed on the first conductive layer 412 by covering the first conductive layer 412 and the intermediate layer 414 using an electrified material, for example.

In an exemplary embodiment, the first electrified layer 413-2 includes a conductive material. The first electrified layer 413-2 may include a metal. The first electrified layer 413-2 may be formed by a depositing or sputtering process.

A surface of the first electrified layer 413-2 may have a shape corresponding to that of the surface of the conductive layer 412. The surface of the first electrified layer 413-2 is defined as the first frictional surface 41-2S. Therefore, the first frictional surface 41-2S may be defined as a surface of the protruding portions of the first electrified layer 413-2 corresponding to the conductive patterns 412*b*.

Figure 9G:
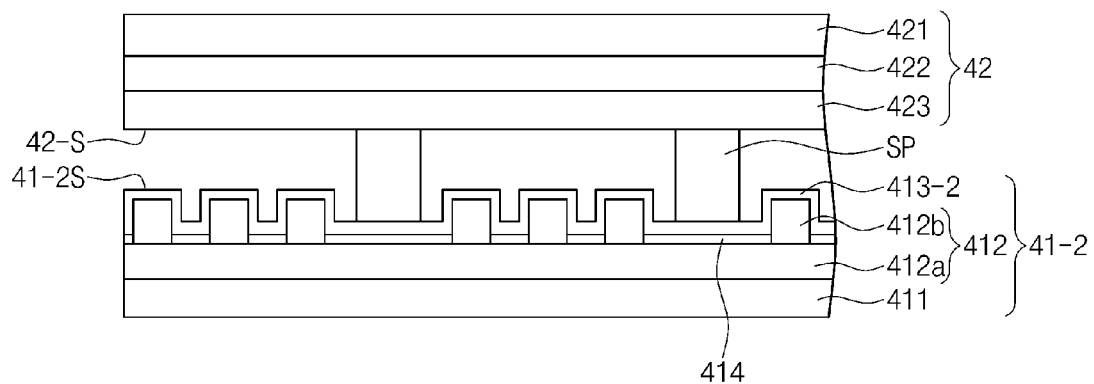

Referring to FIG. 9G, the first electrified substrate 41-2 is coupled to the second electrified substrate 42 to form the energy generating module 40-2. The first and second electrified substrates 41-2 and 42 are coupled to each other such that the first frictional surface 41-2S faces the second frictional surface 42-S.

The spacer SP is disposed to overlap the intermediate layer 414. In an exemplary embodiment, the spacer SP may be provided after being coupled to the second electrified substrate 42, such that the manufacturing process of the first electrified substrate 41-2 may be simplified.

According to an exemplary embodiment, the spacer SP is provided together with the first electrified substrate 41-2 after being formed on the first electrified substrate 41-2. In such an embodiment, the spacer SP is provided after being disposed to correspond to the intermediate layer 414, and thus defects caused by misalignment between the first and second electrified substrates 41-2 and 42 may be reduced.

In such an embodiment, the spacer SP is coupled to the first electrified substrate 41-2 before coupling the first electrified substrate 41-2 to the second electrified substrate 42, the second electrified substrate 42 may effectively make contact with or are spaced apart from the first electrified substrate 41-2. Accordingly, the energy generating module 40-2 effectively utilizes the relative movement of the parts coupled to the second electrified substrate 42.

In an exemplary embodiment, the spacer SP may be fixed to each of the first electrified substrate 41-2 and the second electrified substrate 42 when the first and second electrified substrates 41-2 and 42. In such an embodiment, where the spacer SP is coupled to the first and second electrified substrates 41-2 and 42, the first and second electrified substrates 41-2 and 42 may have elasticity to allow the relative movement thereof to effectively generate the triboelectricity.

In such an embodiment, where each of the first and second electrified substrates 41-2 and 42 is coupled to the spacer SP, the first and second electrified substrates 41-2 and 42 are stably coupled to each other even though the frictional event occurs on the display device, such that the reliability of the energy generating module 40-2 is improved.

FIGS. 10A to 10D are cross-sectional views showing an alternative exemplary embodiment of a method of manufacturing a first electrified substrate according to the invention. The same or like elements shown in FIGS. 10A to 10D have been labeled with the same reference characters as used above to describe exemplary embodiments of the energy generating module with reference to FIGS. 9A to 9F, and any repetitive detailed description thereof will hereinafter be omitted or simplified.

Figure 10A:
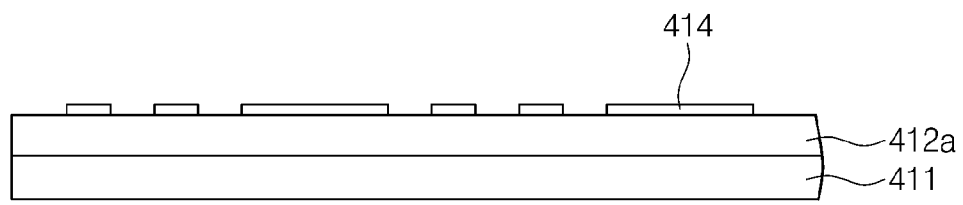
FIGS. 10A to 10D are cross-sectional views showing an alternative exemplary embodiment of a method of manufacturing a first electrified substrate, according to the invention.

Referring to FIG. 10A, in an exemplary embodiment, a base layer 412a and an intermediate layer 414 are sequentially provided, e.g., formed, on a first base substrate 411. The processes of forming the base layer 412a and the intermediate layer 414 correspond to the processes shown in FIGS. 9B and 9C, and thus repetitive detailed description thereof will be omitted.

Figure 10B:
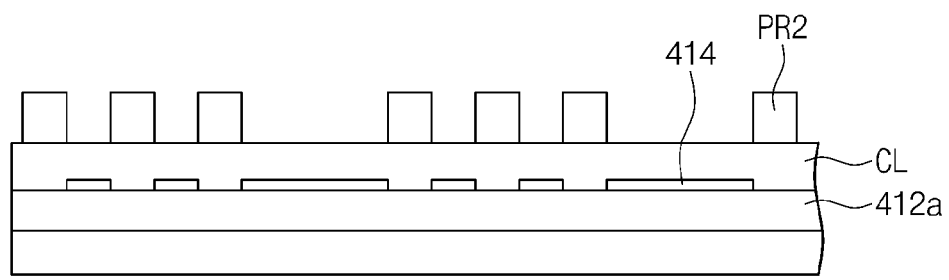

Referring to FIG. 10B, a conductive layer CL is provided on the base layer 412a and the intermediate layer 414 to cover the base layer 412a and the intermediate layer 414. The conductive layer CL may be formed by a solution, deposition, or sputtering process, for example.

A photoresist pattern PR2 is provided on the conductive layer CL. The photoresist pattern PR2 may be formed by forming a photoresist layer (not shown) on the conductive layer CL and patterning the photoresist layer.

The photoresist pattern PR may not overlap the intermediate layer 414 when viewed from a top view. The photoresist pattern PR2 exposes portions of the conductive layer CL, which overlap the intermediate layer 414. The photoresist pattern PR2 may overlap a plurality of conductive patterns 412b described below.

Figure 10C:
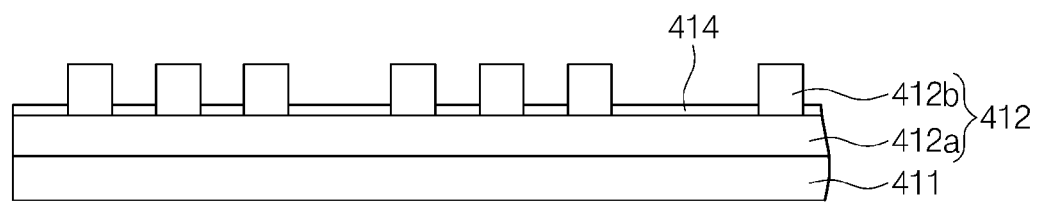

Referring to FIGS. 10B and 10C, the conductive patterns 412b may be formed on the base layer 412a using an etching process. The conductive patterns 412b are formed by removing portions of the conductive layer CL exposed through the photoresist pattern PR2.

Thus, the intermediate layer 414 is exposed by removing the portions of the conductive pattern 412b that overlap the intermediate layer 414. The intermediate layer 414 has a thickness smaller than that of the conductive patterns 412b. A first conductive layer 412, which are configured to include the base layer 412a and the conductive patterns 412b, has a protruding surface due to the conductive patterns 412b. Then, the photoresist pattern PR2 is removed from the intermediate layer 414 using a strip process.

Figure 10D:
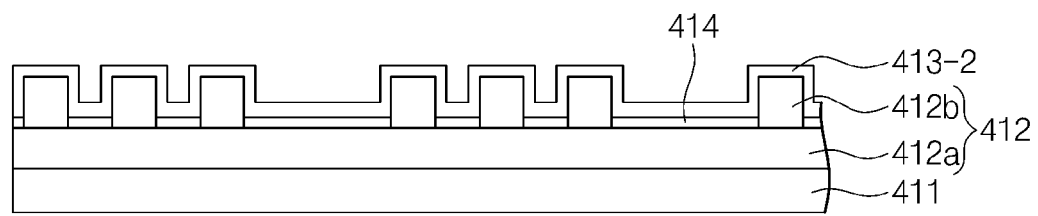

Referring to FIG. 10D, a first electrified layer 413 is provided on the first conductive layer 412. The first electrified layer 413 may be formed by covering the first conductive layer 412 and the intermediate layer 414 using an electrification material. The process of forming the first electrified layer 413 is similar to the process shown in FIG. 9F, and thus repetitive detailed description thereof will be omitted.

In an exemplary embodiment, as described above, the first electrified substrate 41-2 may include the conductive patterns 412b formed using a photolithography process, but it should not be limited thereto or thereby. In an alternative exemplary embodiment, the conductive patterns 412b may be formed by various processes used for forming a conventional printed circuit board. Accordingly, the display device includes the energy generating module 40-2 manufactured using the processes of forming the conventional printed circuit board without using additional process and equipment, and thus the manufacturing cost of the display device may be reduced.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
   an accommodating member, in which an inner space is defined;
   a display panel accommodated in the inner space in the accommodating member; and
   an energy generating module disposed between the accommodating member and the display panel and which produces a triboelectricity,
   wherein the energy generating module comprises:
      a first electrified substrate fixed to the accommodating member; and
      a second electrified substrate disposed on the first electrified substrate,
   wherein the second electrified substrate moves relative to the first electrified substrate by a frictional event, and
      wherein the triboelectricity is produced by a relative movement between the first and second electrified substrates.

2. The display device of claim 1, wherein
   the first electrified substrate comprises:
      a first base substrate;
      a first conductive layer disposed on the first base substrate; and
      a first electrified layer disposed on the first conductive layer, and
   the second electrified substrate comprises:
      a second base substrate disposed opposite to the first base substrate;
      a second conductive layer disposed on the second base substrate; and
      a second electrified layer disposed on the second conductive layer and electrically connected to the second conductive layer.

3. The display device of claim 1, wherein
   the first electrified substrate comprises a first frictional surface defined on a surface of the first electrified layer, which faces the second electrified layer,
   the second electrified substrate comprises a second frictional surface defined on a surface of the second electrified layer, which faces the first electrified layer,
   the second frictional surface comprises a material positioned in a triboelectric series different from a material of the first frictional surface, and
   the first and second frictional surfaces have different polarities from each other by the frictional event.

4. The display device of claim 3, wherein the first electrified layer and the first conductive layer are integrally formed as a single unitary and indivisible unit.

5. The display device of claim 3, wherein the first conductive layer comprises:
   a base layer comprising a conductive material and disposed on the first base substrate to cover an entire surface of the first base substrate; and
   a plurality of conductive patterns disposed on the base layer, comprising a conductive material, and electrically connected to the base layer,
   wherein the first electrified layer covers the base layer and the conductive patterns, and
   wherein the first frictional surface overlaps the conductive patterns.

6. The display device of claim 5, wherein the base layer comprises a same material as the conductive patterns.

7. The display device of claim 6, wherein
the first electrified substrate further comprises an intermediate layer disposed between the first conductive layer and the first electrified layer to cover portions of the base layer, which are exposed through the conductive patterns, and
the first electrified layer covers the intermediate layer and the conductive patterns.

8. The display device of claim 7, wherein
the first conductive layer comprises a same material as a material of the second conductive layer, and
the intermediate layer comprises a same material as a material of the second electrified layer.

9. The display device of claim 3, wherein
the first frictional surface has a positive (+) electric charge by the frictional event, and
the second frictional surface has a negative (−) electric charge by the frictional event.

10. The display device of claim 9, wherein
the material of the second frictional surface comprises an epoxy resin, and
the material of the first frictional surface comprises a metal material.

11. The display device of claim 10, wherein the metal material comprises copper (Cu), nickel (Ni), or gold (Au).

12. The display device of claim 1, further comprising:
a spacer disposed between the first and second electrified substrates and which allows the first frictional surface to be spaced apart from the second frictional surface.

13. The display device of claim 12, wherein the spacer comprises an insulating material having an elasticity.

14. The display device of claim 1, wherein the second electrified substrate moves substantially in a thickness direction of the second electrified substrate with respect to the first electrified substrate.

15. The display device of claim 1, wherein the second electrified substrate and the first electrified substrate relatively move in opposite directions from each other.

16. The display device of claim 1, wherein
the display panel comprises an organic light emitting diode,
the second electrified substrate is fixed to the display panel and integrally moves together with the display panel, and
the display panel moves in the inner space by the frictional event.

17. The display device of claim 1, further comprising:
a light source disposed in the inner space and which provides light to the display panel; and
an optical member disposed between the display panel and the accommodating member,
wherein the second electrified substrate is fixed to the optical member and integrally moves together with the optical member, and
the optical member moves in the inner space by the frictional event.

18. The display device of claim 1, wherein the energy generating module further comprises a rectifying circuit electrically connected to each of the first and second electrified substrates to rectify the triboelectricity.

19. The display device of claim 18, wherein the energy generating module further comprises a chargeable module connected to the rectifying circuit and charged with the triboelectricity output from the rectifying circuit.

20. The display device of claim 18, wherein
the energy generating module is defined by a plurality of energy generating modules, wherein each of the energy generating modules comprises the first and second electrified substrates, and
the energy generating modules are disposed to be spaced apart from each other on a plane surface.

* * * * *